United States Patent
Zebulon et al.

(10) Patent No.: US 12,052,585 B2
(45) Date of Patent: Jul. 30, 2024

(54) CLIENT STEERING METHOD IN MULTIPLE ACCESS POINT NETWORK AND DEVICE THEREFOR

(71) Applicant: WILUS INSTITUTE OF STANDARDS AND TECHNOLOGY INC., Gyeonggi-do (KR)

(72) Inventors: Asaf Zebulon, Seoul (KR); Fathan Adi Pranaya, Gyeonggi-do (KR); Hwanwoong Hwang, Gyeonggi-do (KR); Woojin Ahn, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 353 days.

(21) Appl. No.: 17/605,575

(22) PCT Filed: Apr. 24, 2020

(86) PCT No.: PCT/KR2020/005481
§ 371 (c)(1),
(2) Date: Jan. 24, 2022

(87) PCT Pub. No.: WO2020/218897
PCT Pub. Date: Oct. 29, 2020

(65) Prior Publication Data
US 2022/0150721 A1     May 12, 2022

(30) Foreign Application Priority Data

Apr. 24, 2019  (KR) .................. 10-2019-0047656
Oct. 7, 2019   (KR) .................. 10-2019-0124131
Apr. 3, 2020   (KR) .................. 10-2020-0041171

(51) Int. Cl.
*H04W 16/28* (2009.01)
*H04L 1/00* (2006.01)
*H04W 84/12* (2009.01)

(52) U.S. Cl.
CPC .......... *H04W 16/28* (2013.01); *H04L 1/0003* (2013.01); *H04W 84/12* (2013.01)

(58) Field of Classification Search
CPC .................................................. H04W 16/28
See application file for complete search history.

(56) References Cited

U.S. PATENT DOCUMENTS

| 8,654,732 B2 | 2/2014 | Melkote et al. | |
| 2009/0010222 A1* | 1/2009 | Jechoux | H04W 36/30 370/331 |

(Continued)

FOREIGN PATENT DOCUMENTS

| KR | 10-2011-0071105 | 6/2011 |
| KR | 10-1691761 | 12/2016 |

(Continued)

OTHER PUBLICATIONS

International Search Report for PCT/KR2020/005481 mailed on Aug. 6, 2020 and its English translation from WIPO (now published as WO 2020/218897).

(Continued)

*Primary Examiner* — Fahmida S Chowdhury
(74) *Attorney, Agent, or Firm* — Womble Bond Dickinson (US) LLP

(57) ABSTRACT

A method for client steering in a multiple access point (AP) network is performed by a controller and comprises the steps of: receiving, from one or more APs, pieces of related information for the client steering; on the basis of the pieces of information, determining a particular candidate BSS for the client steering from among a plurality of BSSs; and (Continued)

transmitting a request message for the client steering to an AP operating the particular candidate BSS.

20 Claims, 15 Drawing Sheets

(56) References Cited

U.S. PATENT DOCUMENTS

| | | | |
|---|---|---|---|
| 2009/0016296 A1* | 1/2009 | Jechoux | H04W 48/20 |
| | | | 370/329 |
| 2015/0304936 A1 | 10/2015 | Jung et al. | |
| 2017/0013493 A1* | 1/2017 | HomChaudhuri | ............... |
| | | | H04W 36/0085 |
| 2017/0280337 A1* | 9/2017 | Bahr | H04W 48/20 |
| 2018/0199215 A1* | 7/2018 | Patil | H04W 52/0225 |
| 2018/0206184 A1* | 7/2018 | Bahr | H04W 48/20 |
| 2018/0213412 A1* | 7/2018 | Makati | H04W 16/26 |
| 2018/0288664 A1* | 10/2018 | Ouzieli | H04W 36/08 |
| 2019/0075469 A1* | 3/2019 | Mahoney | H04B 17/318 |
| 2019/0268892 A1* | 8/2019 | Gidvani | H04B 7/0413 |
| 2020/0068520 A1* | 2/2020 | Marri Sridhar | H04W 8/005 |

FOREIGN PATENT DOCUMENTS

| | | |
|---|---|---|
| WO | 2018/194930 | 10/2018 |
| WO | 2020/218897 | 10/2020 |

OTHER PUBLICATIONS

Written Opinion of the International Searching Authority for PCT/KR2020/005481 mailed on Aug. 6, 2020 and its English translation provided by Google Translate (now published as WO 2020/218897).

* cited by examiner

CLIENT STEERING METHOD IN MULTIPLE ACCESS POINT NETWORK AND DEVICE THEREFOR

CROSS-REFERENCE TO RELATED APPLICATIONS

This application is the National Stage filing under 35 U.S.C. 371 of International Application No. PCT/KR2020/005481, which was filed on Apr. 24, 2020, and which claims priority under 35 U.S.C. 119(a) to Korean Patent Application No. 10-2019-0047656 filed with the Korean Intellectual Property Office on Apr. 24, 2019, Korean Patent Application No. 10-2019-0124131 filed with the Korean Intellectual Property Office on Oct. 7, 2019, and Korean Patent Application No. 10-2020-0041171 filed with the Korean Intellectual Property Office on Apr. 3, 2020. The disclosures of the above patent applications are incorporated herein by reference in their entirety.

TECHNICAL FIELD

The present disclosure relates to a client steering method in a multiple access point network and a device therefor.

BACKGROUND ART

With the wide spread of mobile devices in recent years, a wireless local area network (LAN) technology capable of providing fast wireless Internet service to mobile devices has been significantly spotlighted. The Wireless LAN technology is a technology that enables mobile devices such as smartphones, smart pads, laptop computers, portable multimedia players, embedded devices, or the like, to access the Internet wirelessly at home, business, or in a specific service provision area based on wireless communication technology in a short distance.

Institute of Electrical and Electronics Engineers (IEEE) 802.11 has been commercializing or developing various technology standards since the initial wireless LAN technology is supported using 2.4 GHz frequency. First, IEEE 802.11b uses frequencies of a 2.4 GHz band to support a communication speed of a maximum of 11 Mbps. IEEE 802.11a which is commercialized after the IEEE 802.11b uses frequencies of a 5 GHz band, instead of the 2.4 GHz band, to reduce an influence by interference as compared with the frequencies of the 2.4 GHz band which are quite congested and improve the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g significantly comes into the spotlight by using the frequencies of the 2.4 GHz band similarly to the IEEE 802.11b to implement the communication speed of a maximum of 54 Mbps and satisfying backward compatibility, and even in terms of the communication distance, IEEE 802.11g is superior to the IEEE 802.11a.

Moreover, as a technology standard established to overcome a limitation of the communication speed which has been pointed out as a vulnerability in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and, further, is based on a multiple inputs and multiple outputs (MIMO) technology in which multiple antennas are used at both a transmitting unit and a receiving unit in order to minimize a transmission error and optimize a data speed. Further, the standard may use a coding scheme in which multiple copies overlapping with each other are transmitted in order to increase data reliability.

As the wireless LAN is widely spread and applications using the wireless LAN are diversified, new wireless LAN systems for supporting a higher throughput (very high throughput (VHT)) than the data processing speed supported by the IEEE 802.11n have been demanded. Among them, IEEE 802.11ac supports a wide bandwidth (80 MHz to 160 MHz) in the 5 GHz frequencies. The IEEE 802.11ac standard is defined only in the 5 GHz band; however, initial 11ac chipsets will support even operations in the 2.4 GHz band for the backward compatibility with the existing 2.4 GHz band products. Theoretically, according to the standard, wireless LAN speeds of multiple stations may be up to a minimum of 1 Gbps and a maximum single link speed may be up to a minimum of 500 Mbps. This is achieved by extending concepts of a wireless interface accepted by 802.11n, such as a wider wireless bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11 ad has been provided. The IEEE 802.11ad is a transmission standard in which a speed of a maximum of 7 Gbps is provided by using a beamforming technology and is suitable for high bitrate moving picture streaming such as massive data or non-compression HD video. However, the 60 GHz frequency band is difficult to pass through an obstacle, and thus may be used only among devices in a short-distance space, which may be disadvantageous.

Meanwhile, in recent years, in order to provide a high-efficiency and high-performance wireless communication technology in a high-density environment as next-generation wireless communication technology standards after the 802.11ac and 802.11ad, discussions have been continuously made. That is, in a next-generation wireless LAN environment, communication with high frequency efficiency is to be provided indoors/outdoors under the presence of a high-density station and an access point (AP), and various technologies for implementing the communication have been developed.

In the case of a wireless LAN, since multiple terminals form a network with one AP, it is likely that communication coverage is narrow and a shadow area occurs in the same space depending on the position of the AP. In order to solve the above problems, a technology for increasing communication coverage by installing a plurality of APs constituting the same network is being discussed mainly by the Wi-Fi Alliance.

DISCLOSURE OF INVENTION

Technical Problem

An aspect of the present specification is to provide a method for steering of a client in a multiple access point network.

An aspect of the present specification is to provide a method for on-boarding of a client in a multiple access point network.

Solution to Problem

The present specification provides a method for performing a method for steering of a client in a multiple access point (AP) network.

A method performed by a controller includes: receiving information for steering of a client from one or more APs, the one or more APs operating multiple basic service sets (BSSs), and the information including first information including parameters related to a connection state of a channel which is being used by each of the multiple BSSs, and second information including parameters related to capabilities of the multiple BSSs and parameters related to a capability of the client; determining a particular candidate BSS for steering of the client among the multiple BSSs, based on the first information and the second information; and transmitting, to an AP operating the particular candidate BSS, a request message for steering of the client, wherein the controller is a logical entity included in the multiple AP network.

In addition, in the present specification, the method further includes calculating throughputs of the multiple BSSs, based on the first information and the second information, and the particular candidate BSS is determined based on the throughputs.

In addition, in the present specification, the throughputs are calculated using a neural network system.

In addition, in the present specification, the particular candidate BSS is a BSS having a highest throughput among the throughputs.

In addition, in the present specification, the first information includes a parameter indicating a channel usage rate, a parameter indicating a signal strength, and a parameter indicating a transmission speed, and the second information includes a parameter indicating a spatial stream, a parameter indicating a modulation and coding scheme (MCS)-specific data rate, a parameter indicating a channel bandwidth, a parameter indicating a band frequency, and a parameter indicating a connection state with a WAN.

In addition, in the present specification, the calculating of the throughputs includes: calculating first throughput information, based on the parameter indicating a spatial stream, the parameter indicating an MCS-specific data rate, the parameter indicating a channel bandwidth, and the parameter indicating a band frequency, which are included in the first information and the second information; and calculating the throughputs by additionally considering the parameter indicating a connection state with the WAN with respect to the first throughput information.

In addition, in the present specification, the parameter indicating a connection state with the WAN is determined according to whether a connection from the AP to the WAN is a wired connection or a wireless connection.

In addition, in the present specification, when the connection from the AP to the WAN is a wireless connection, the parameter indicating a connection state with the WAN is determined based on whether the wireless connection is a backhaul-dedicated connection or a connection sharing a backhaul and a fronthaul.

In addition, in the present specification, the first throughput information and the throughputs are calculated using different neural network systems, respectively.

In addition, in the present specification, the request message is transmitted when the highest throughput is equal to or greater than a pre-configured first threshold value.

In addition, in the present specification, the client is included in a first BSS among the multiple BSSs, and the request message is transmitted when a difference between the highest throughput and a throughput of the first BSS exceeds a pre-configured second threshold value.

In addition, in the present specification, the second threshold value is a particular constant.

In addition, in the present specification, the second threshold value is determined based on a percentage value using the throughput of the first BSS.

In addition, in the present specification, each of the throughputs is a value indicating, when the client is included in one BSS among the multiple BSSs, a connection state between the client and an AP operating the one BSS.

In addition, in the present specification, a device for performing a method for steering of a client in a multiple access point (AP) network includes: a transceiver; a controller; and a memory configured to store instructions for operations executed by the controller and connected to the controller, wherein the operations include: receiving information for steering of a client from one or more APs, the one or more APs operating multiple basic service sets (BSSs), and the information including first information including parameters related to a connection state of a channel which is being used by each of the multiple BSSs, and second information including parameters related to capabilities of the multiple BSSs and parameters related to a capability of the client; determining a particular candidate BSS for steering of the client among the multiple BSSs, based on the first information and the second information; and transmitting, to an AP operating the particular candidate BSS, a request message for steering of the client, wherein the controller is a logical entity included in the multiple AP network.

In addition, in the present specification, the operations further include calculating throughputs of the multiple BSSs, based on the first information and the second information, and the particular candidate BSS is determined based on the throughputs.

In addition, in the present specification, the particular candidate BSS is a BSS having a highest throughput among the throughputs.

In addition, in the present specification, the first information includes a parameter indicating a channel usage rate, a parameter indicating a signal strength, and a parameter indicating a transmission speed, and the second information includes a parameter indicating a spatial stream, a parameter indicating a modulation and coding scheme (MCS)-specific data rate, a parameter indicating a channel bandwidth, a parameter indicating a band frequency, and a parameter indicating a connection state with a WAN.

In addition, in the present specification, the calculating of the throughputs includes: calculating first throughput information, based on the parameter indicating a spatial stream, the parameter indicating an MCS-specific data rate, the parameter indicating a channel bandwidth, and the parameter indicating a band frequency, which are included in the first information and the second information; and calculating the throughputs by additionally considering the parameter indicating a connection state with the WAN with respect to the first throughput information.

In addition, in the present specification, each of the throughputs is a value indicating, when the client is included in one BSS among the multiple BSSs, a connection state between the client and an AP operating the one BSS.

Advantageous Effects of Invention

An embodiment of the present disclosure provides a client steering method in a multiple access point network and a device therefor.

BEST MODE FOR CARRYING OUT THE INVENTION

Figure 1:
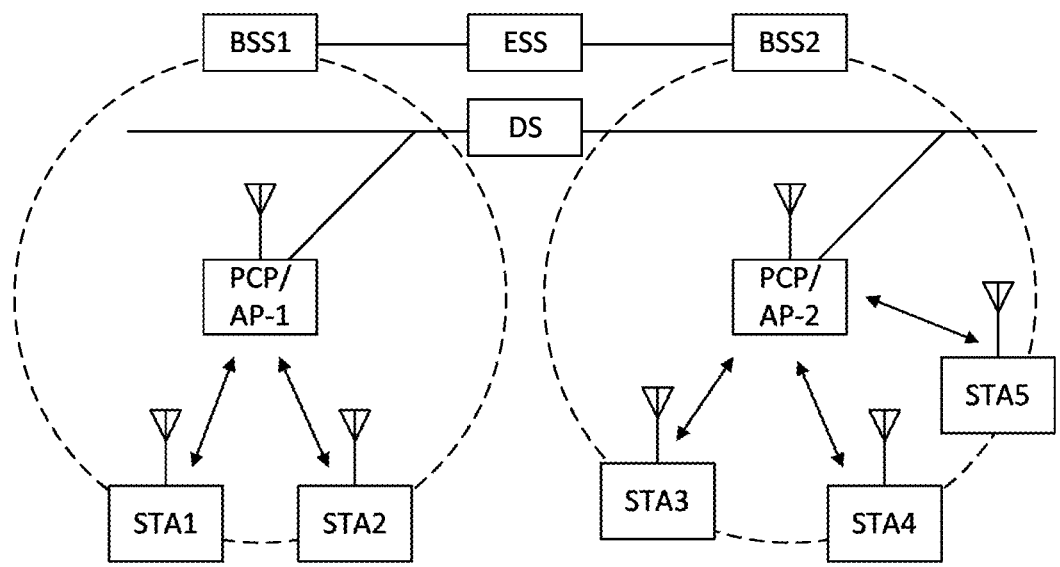
FIG. 1 shows a wireless LAN system according to an embodiment of the present disclosure.

Hereinafter, embodiments of the present disclosure will be described in detail with reference to the accompanying drawings so that those skilled in the art may easily perform the present disclosure. However, the present disclosure may be implemented by various modifications and is not limited to the embodiments described herein. In the drawings, in order to clarify the present disclosure, parts that are not related to description are omitted and like reference numerals represent like elements throughout the specification.

In addition, when a part "includes" an element, unless described to the contrary, the term "includes" does not indicate that another element is excluded but instead indicates that the other element may be further included.

FIG. 1 shows a wireless LAN system according to an embodiment of the present disclosure. The wireless LAN system includes one or more basic service sets (BSSs), and the BSS represents a set of devices that are successfully synchronized with each other to communicate with each other. In general, the BSS may be classified into an infrastructure BSS and an independent BSS (IBSS), and FIG. 1 illustrates the infrastructure BSS between them.

As shown in FIG. 1, the infrastructure BSSs BSS1 and BSS2 include one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station STA is a predetermined device including medium access control (MAC) in accordance with a regulation of an IEEE 802.11 standard and a physical layer interface for a wireless medium, and includes both a non-access point (non-AP) station and an access point (AP) in a broad sense. Further, in the present specification, the term 'terminal' may be used as a concept including all wireless LAN communication devices such as the station and the AP. A station for wireless communication includes a processor and a transmit/receive unit and according to the embodiment, may further include a user interface unit, a display unit, or the like. The processor may generate a frame to be transmitted through a wireless network or process a frame received through the wireless network and besides, perform various processes for controlling the station. In addition, the transmit/receive unit is functionally connected with the processor and transmits and receives frames through the wireless network for the station.

The access point (AP) is an entity that provides access to the distribution system (DS) via a wireless medium for the station associated therewith. In the infrastructure BSS, communication among non-AP stations is, in principle, performed via the AP, but when a direct link is configured, direct communication is enabled even among the non-AP stations. Meanwhile, in the present disclosure, the AP is used as a concept including a personal BSS coordination point (PCP) and may include concepts including a centralized controller, a base station (BS), a node-B, a base transceiver system (BTS), a site controller, or the like in a broad sense.

A plurality of infrastructure BSSs may be connected with each other through the distribution system (DS). In this case, a plurality of BSSs connected through the distribution system is referred to as an extended service set (ESS).

Figure 2:
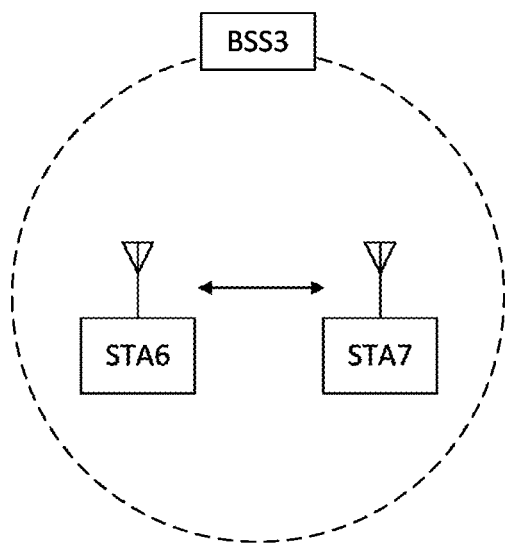
FIG. 2 shows a wireless LAN system according to another embodiment of the present disclosure.

FIG. 2 shows an independent BBS, which is a wireless LAN system according to another embodiment of the present disclosure. In the embodiment of FIG. 2, descriptions of parts that are the same as or correspond to the embodiment of FIG. 1 will not be repeated.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the stations STA6 and STA7 may be directly connected with each other.

Figure 3:
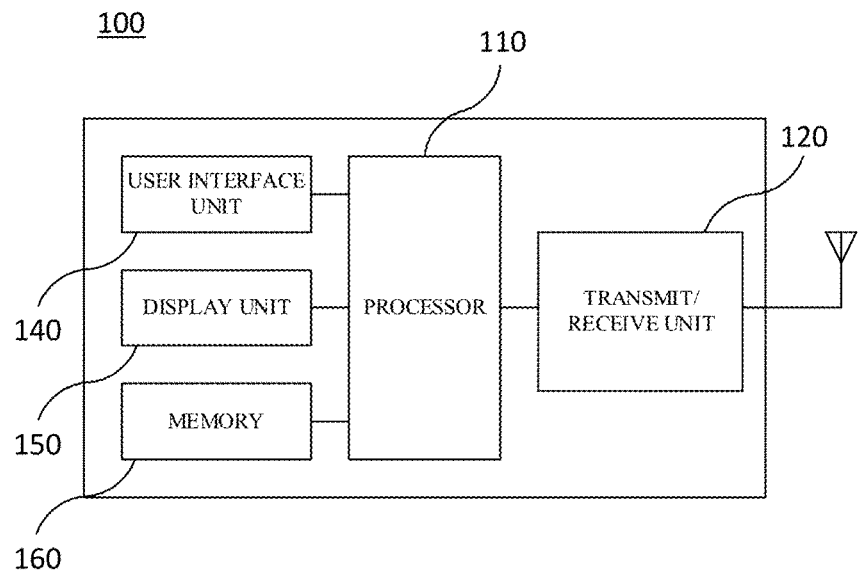
FIG. 3 is a block diagram illustrating a configuration of a station according to an embodiment of the present disclosure.

FIG. 3 is a block diagram illustrating configuration of a station 100 according to an embodiment of the present disclosure.

As illustrated in FIG. 3, the station 100 according to the embodiment of the present disclosure may include a processor 110, a transmit/receive unit 120, a user interface unit 140, a display unit 150, and a memory 160.

First, the transmit/receive unit 120 may transmit and receive a wireless signal such as a wireless LAN physical layer frame, or the like, and may be embedded in the station 100 or externally provided. According to the embodiment, the transmit/receive unit 120 may include at least one transmit/receive module using different frequency bands. For example, the transmit/receive unit 120 may include transmit/receive modules having different frequency bands such as 2.4 GHz, 5 GHz, and 60 GHz. According to an embodiment, the station 100 may include a transmit/receive module using a frequency band of 6 GHz or more and a transmit/receive module using a frequency band of 6 GHz or less. Each transmit/receive module may perform wireless communication with the AP or an external station according to a wireless LAN standard of a frequency band supported by the transmit/receive module. The transmit/receive unit 120 may operate only one transmit/receive module at a time or simultaneously operate multiple transmit/receive modules together depending on the performance and requirements of the station 100. When the station 100 includes a plurality of transmit/receive modules, each transmit/receive module may be implemented in an independent form or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present disclosure may execute various commands or programs and process data in the station 100. Further, the processor 110 may control the respective units of the station 100 and control data transmission/reception among the units. According to the embodiment of the present disclosure, the processor 110 may execute the program for accessing the AP stored in the memory 160 and may receive a communication configuration message transmitted by the AP. Further, the processor 110 may read information on a priority condition of the station 100 included in the communication configuration message and request the access to the AP based on the information on the priority condition of the station 100. The processor 110 of the present disclosure may refer to a main control unit of the station 100 and according to the embodiment, the processor 110 may refer to a control unit for individually controlling some component of the station 100, for example, the transmit/receive unit 120, and the like. The processor 110 may be a modulator and/or demodulator which modulates and/or demodulates wireless signals transmitted to and/or received from the transmit/receive unit 120. The processor 110 controls various operations of wireless signal transmission/reception of the station 100 according to the embodiment of the present disclosure. A detailed embodiment thereof will be described below.

The station 100 illustrated in FIG. 3 is presented as a block diagram according to an embodiment of the present disclosure, where separate blocks are illustrated as logically distinguished elements of the device. Accordingly, the elements of the device may be mounted as a single chip or multiple chips depending on design of the device. For example, the processor 110 and the transmit/receive unit 120 may be implemented as a single integrated chip or implemented as a separate chip. Further, in the embodiment of the present disclosure, some components of the station 100, for example, the user interface unit 140 and the display unit 150 may be optionally provided in the station 100.

Figure 4:
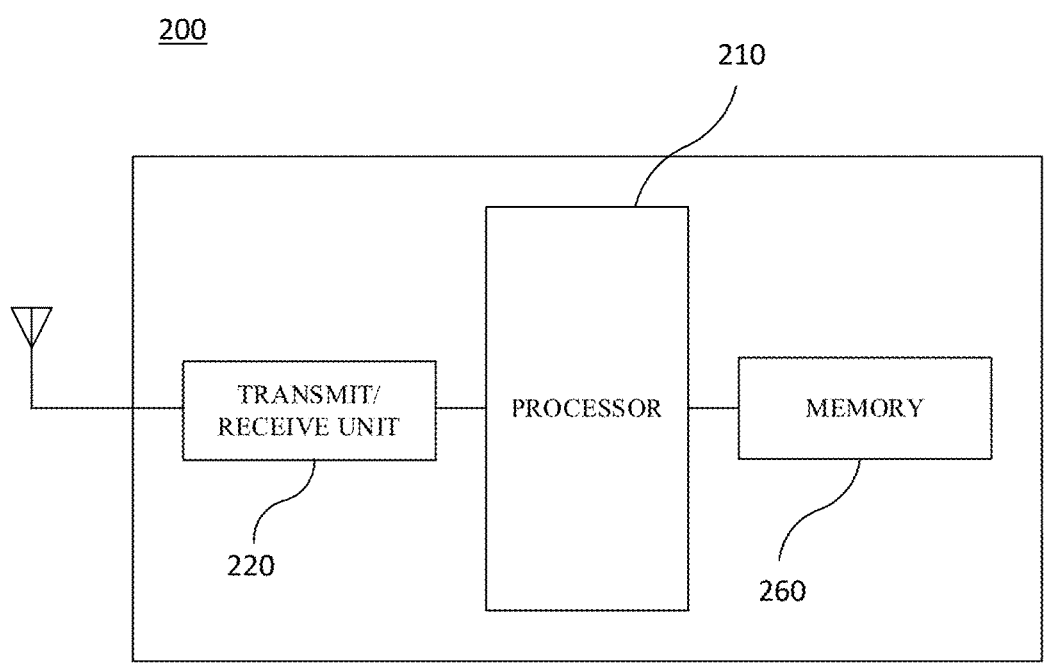
FIG. 4 is a block diagram illustrating a configuration of an access point according to an embodiment of the present disclosure.

FIG. 4 is a block diagram illustrating a configuration of an AP 200 according to an embodiment of the present disclosure.

As illustrated in FIG. 4, the AP 200 according to the embodiment of the present disclosure may include a processor 210, a transmit/receive unit 220, and a memory 260. In FIG. 4, among the components of the AP 200, descriptions of parts which are the same as or correspond to the components of the station 100 of FIG. 2 will not be repeated.

Referring to FIG. 4, the AP 200 according to the present disclosure includes the transmit/receive unit 220 for operating the BSS in at least one frequency band. As described in the embodiment of FIG. 3, the transmit/receive unit 220 of the AP 200 may also include a plurality of transmit/receive modules using different frequency bands. That is, the AP 200 according to the embodiment of the present disclosure may include two or more transmit/receive modules of different frequency bands, for example, of 2.4 GHz, 5 GHz, and 60 GHz together. Preferably, the AP 200 may include a transmit/receive module using a frequency band of 6 GHz or more and a transmit/receive module using a frequency band of 6 GHz or less. Each transmit/receive module may perform wireless communication with the station according to a wireless LAN standard of a frequency band supported by the transmit/receive module. The transmit/receive unit 220 may operate only one transmit/receive module at a time or simultaneously operate multiple transmit/receive modules together depending on the performance and requirements of the AP 200.

Next, the memory 260 stores a control program used in the AP 200 and various resulting data. The control program may include an access program for managing the access of the station. Further, the processor 210 may control each of units of the AP 200 and control data transmission/reception among the units. According to the embodiment of the present disclosure, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modulator and/or demodulator which modulates and/or demodulates wireless signals transmitted to and/or received from the transmit/receive unit 220. The processor 210 controls various operations of wireless signal transmission/reception of the AP 200 according to the embodiment of the present disclosure. A detailed embodiment thereof will be described below.

Figure 5:
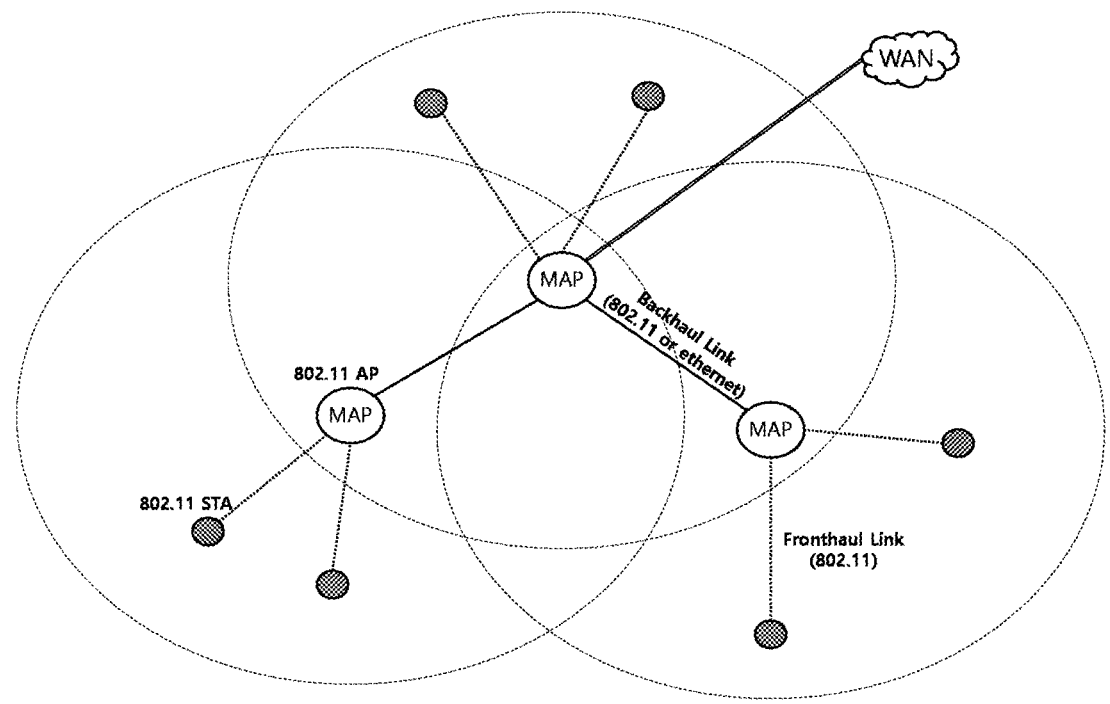
FIG. 5 shows a multiple access point network.

FIG. 5 shows a multiple access point network.

A multi-access point (Multi-AP, MAP) network is configured around one access point (AP) and may include a plurality of BSSs. In this case, the plurality of BSSs may overlap each other. The AP is connected through a backhaul link, and communication with other BSSs may be performed through the backhaul link. The backhaul link may be formed through wireless LAN or Ethernet. The access point that operates the BSS of the MAP network is referred to as a MAP device. Even if the MAP device is not connected to the external network (WAN), if the MAP device and another MAP device connected through the backhaul link are connected to the external network, the MAP device may be connected to the external network through another MAP device connected to the external network.

The MAP device may include a plurality of RF modules capable of operating at the same time. Therefore, the MAP device may operate a plurality of BSSs at the same time. Therefore, the MAP device may operate a fronthaul BSS that may be accessed by non-AP STAs such as smartphones and laptops and operate a backhaul BSS that may be accessed by MAP devices of the same MAP network. Each of the MAP devices in the MAP network may use a different value as the basic service set ID (BSSID) of the fronthaul BSS, and may use the same value as the SSID of the fronthaul BSS. In addition, each of the MAP devices in the MAP network may use the same access security scheme. Therefore, the non-AP station may recognize the MAP network as one wireless LAN profile.

Figure 6:
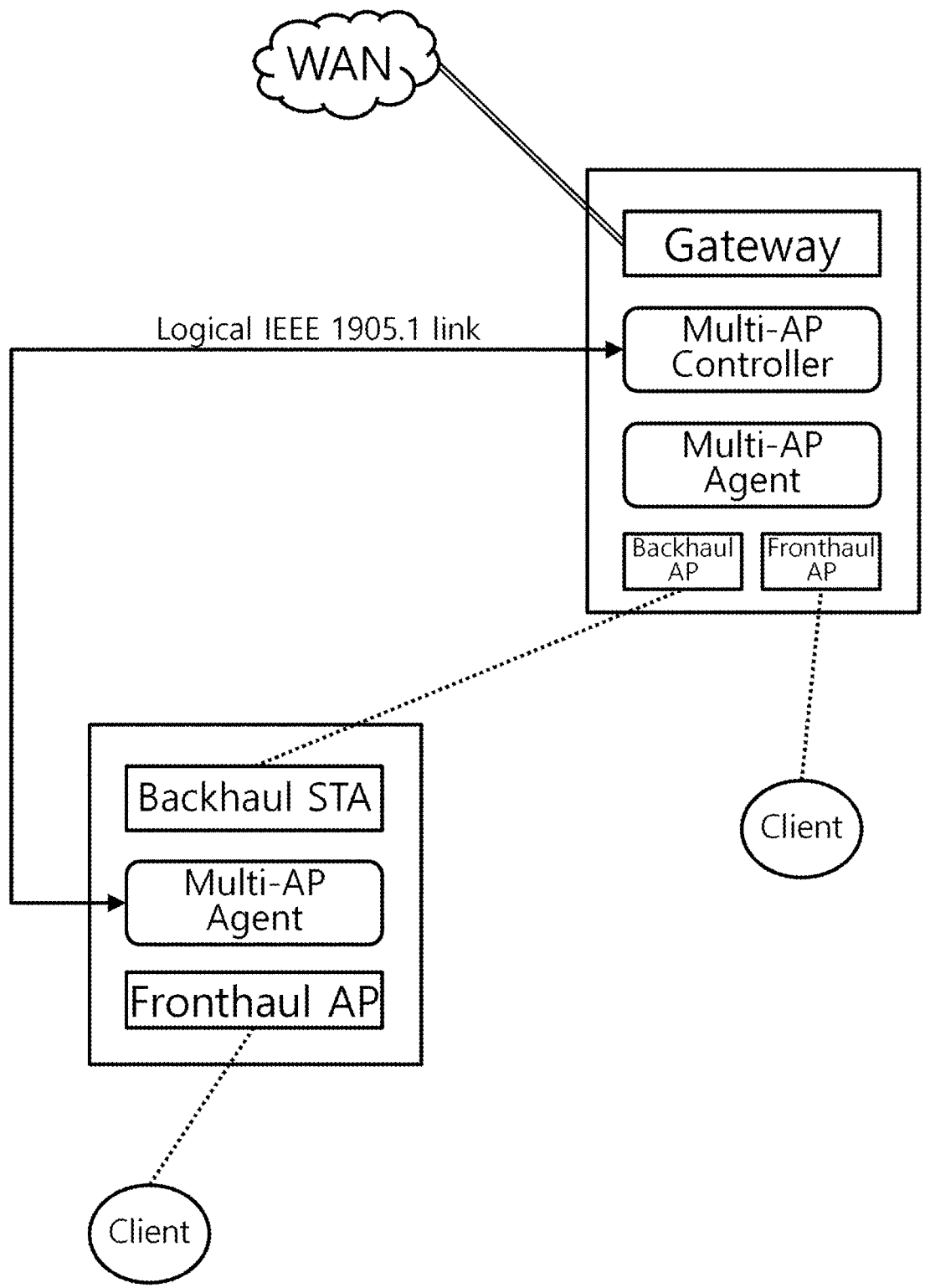
FIG. 6 shows a logical structure of a multiple access point device according to an embodiment of the present disclosure.

FIG. 6 shows a logical structure of a multiple access point device according to an embodiment of the present disclosure.

The MAP network may provide a function beyond signal amplification or packet forwarding provided by an existing wireless LAN repeater or extender. Specifically, the MAP network may provide a function to increase MAP network efficiency by synthesizing various information on the MAP network. For example, when the coverage between MAP devices overlaps, the MAP network may induce the fronthaul BSS to use a channel with less interference or high efficiency between the MAP devices.

In addition, when a new MAP device attempts to enroll in the MAP network, an existing MAP device connected to the MAP network may configure a backhaul link with the new MAP device. In this case, the existing MAP device may configure a backhaul link with the new MAP device in a reliable manner without receiving a user's input of separate information related to security. Specifically, the existing MAP device may transfer information required for MAP network configuration to the new MAP device through the backhaul link. Information required for configuring the MAP network may include at least one of an SSID and a certificate(credential). The connection of a new MAP device to the MAP network is referred to as onboarding. In addition, a new MAP device attempting to enroll in the MAP network may be referred to as an enrollee. In addition, when the non-AP station associated with the MAP network moves, the MAP network may induce roaming to the MAP device with which the non-AP station is to be associated, in consideration of at least one of channel conversion and the load of the BSS.

In order for the MAP network to perform this operation, the MAP network may include one MAP controller and one or more MAP agents. The MAP controller and MAP agent are logical entities. Therefore, one MAP device may include only a MAP controller. Furthermore, one MAP device may include one or more a MAP agent. In addition, one MAP device may include both a MAP controller and a MAP agent. The MAP controller controls the fronthaul AP and the backhaul link in the MAP network. In addition, the MAP controller may receive measurement values and capability data for the fronthaul AP, a client, and the backhaul link from the MAP agent. In addition, the MAP controller may provide an onboarding function for onboarding and provisioning the MAP device to the MAP network. The MAP controller may request that the MAP agent transmits information related to the MAP agent. In addition, the MAP controller may cause the MAP agent to perform commands related to a specific BSS or a specific client. The MAP agent executes commands received from the MAP controller. In addition, the MAP agent may report measurement values and capability data for the fronthaul AP, the client, and the backhaul link to the MAP controller or another MAP agent.

The IEEE 802.11 wireless LAN standard does not define the transmission of information within the BSS to more than 1-hop devices. Therefore, the MAP controller and the MAP agent may transmit and receive information by using the abstraction layer (AL) messaging protocol defined in the IEEE 1905.1 standard. For convenience of description, a message transmitted by using the AL message protocol defined in the IEEE 1905.1 standard is referred to as a message transmitted in the 1905.1 format. The AL is a layer between layer 2 (medium access control (MAC) layer) and layer 3 (internet protocol (IP) layer). The AL is defined for routing and messaging within a multihop network composed of heterogeneous links such as wireless LAN, Ethernet, and physical layer convergence (PLC). A message transmitted by the MAP controller in the 1905.1 format may be transferred to a plurality of MAP agents in a multiple hop distance. Through this, information included in the 1905.1 format message may be transferred to the MAC layer of a specific BSS. Since the MAP agent knows the WAN access point in the MAP network, the MAP agent may transfer a wireless LAN packet transferred by the client to the MAP through 1905.1 format message routing to the WAN access point.

In FIG. 6, a MAP device connected to a WAN includes a gateway, a MAP controller, and a MAP agent. Each MAP device is connected to a client through a fronthaul BSS of a fronthaul AP, and MAP devices in a MAP network are connected by a backhaul AP and a backhaul STA connected to each other through a backhaul link. Another MAP device includes a MAP agent, and is logically connected to the MAP controller. A station coupled to the other MAP device may transmit a wireless LAN packet up to the WAN through a fronthaul, a backhaul link, and a gateway.

When a new MAP device, that is, an enrollee, onboards to the MAP network, the enrollee may onboard through a Wi-Fi simple configuration (WSC) method defined by the Wi-Fi Alliance. Specifically, the MAP device may perform onboarding using a push button configuration (PBC) method of the WSC. This will be described with reference to FIG. 7.

Figure 7:
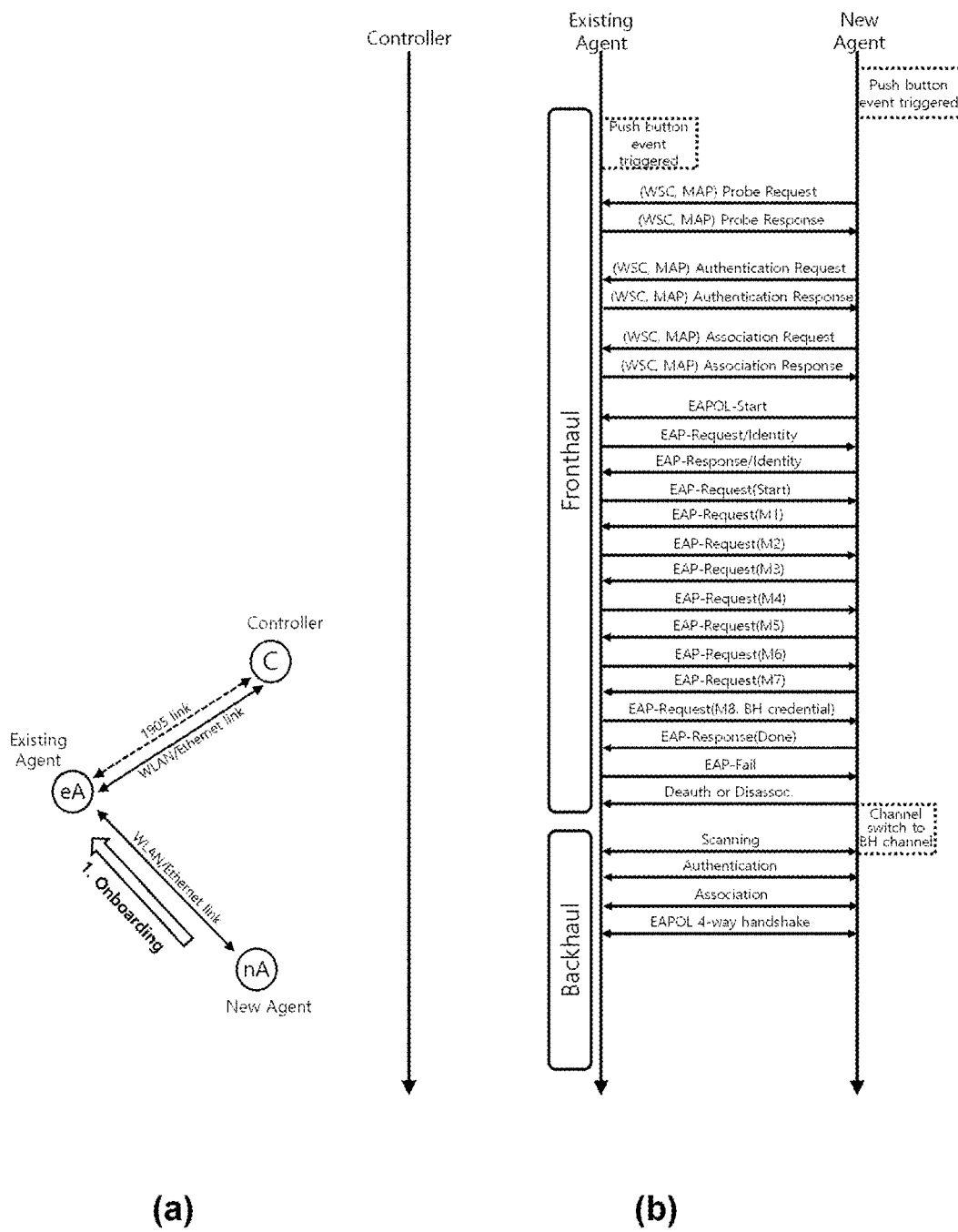
FIG. 7 shows a push-button onboarding according to an embodiment of the present disclosure.

FIG. 7 shows a push-button onboarding according to an embodiment of the present disclosure.

FIG. 7(a) shows a connection relationship of a MAP device (New Agent) nA, that is, an enrollee, attempting to enroll in a MAP network, an existing MAP agent that has enrolled in the MAP network (Existing Agent) eA, and a MAP controller C of the MAP network. The enrollee nA and the existing MAP agent eA are connected through a wireless LAN or Ethernet link, and the existing MAP agent eA is connected to the MAP controller through the wireless LAN or Ethernet link. In addition, the existing MAP agent eA transmits and receives messages related to onboarding to and from the MAP controller through a link configured through the IEEE 1905.1 protocol. In the following description, reference to IEEE 1905 or 1905 indicates the IEEE 1905.1 protocol. The PBC scheme-based onboarding process will be described in detail with reference to FIG. 7(b).

FIG. 7(b) shows the PBC scheme-based onboarding process according to an embodiment of the present disclosure. The MAP device (New Agent), that is, the enrollee, attempting to enroll in the MAP network starts the WSC process when a PBC event occurs. In this case, the PBC event may be generated by a hardware button input or by an input using a user application.

The MAP device may perform transmission by including a WSC information element (IE) in at least one of a probe frame, an authentication frame, and an association frame. In addition, the WSC IE may include a Multi-AP extension subelement including MAP-related information. When the PBC event is triggered, the enrollee nA may configure a bit indicating that the PBC event is triggered in the WSC IE and transmit a probe request frame including the WSC IE. In addition, the enrollee nA may attempt to scan all channels. When the existing MAP agent eA receives a probe request frame including a WSC IE including a bit indicating that the PBC event is triggered, the existing MAP agent eA may configure a bit indicating that the PBC event is triggered in the WSC IE and transmit a probe response frame including the WSC IE. The existing MAP agent eA and the enrollee nA may exchange an authentication request frame, an authentication response frame, an association request frame, and an association response frame with each other. In this case, each of the authentication request frame, the authentication response frame, the association request frame, and the association response frame may include the WSC IE including the bit indicating that the PBC event is triggered. The existing MAP agent eA and the enrollee nA may recognize that the event is related to MAP onboarding based on the Multi-AP extension subelement, and perform the MAP onboarding process. The existing MAP agent eA and the enrollee nA may exchange M1 to M8 messages including network access credential information by using the extensible authentication protocol (EAP) with each other. In this case, the existing MAP agent eA may encrypt and transmit the information required for MAP network configuration to the enrollee nA through the M8 message. The information required for the MAP network configuration may include at least one of an operating channel of the backhaul BSS (BH channel), the SSID, and certificate(credential) information. In the present specification, the operating channel may indicate a channel on which an AP performs an operation. In addition, the operating channel may be defined as a channel bandwidth and a primary channel. After the end of the EAP, the enrollee nA may change the operating channel depending on the information on the operating channel of the backhaul BSS (BH channel) included in the information required for the MAP network configuration. In addition, the enrollee nA may attempt to access the backhaul BSS by using information on the certificate(credential) information included in the information required for the MAP network configuration. When the EAP fails, the enrollee nA and the existing MAP agent eA may exchange M1 to M8 messages including the network access credential information with each other again by using the EAP.

Figure 8:
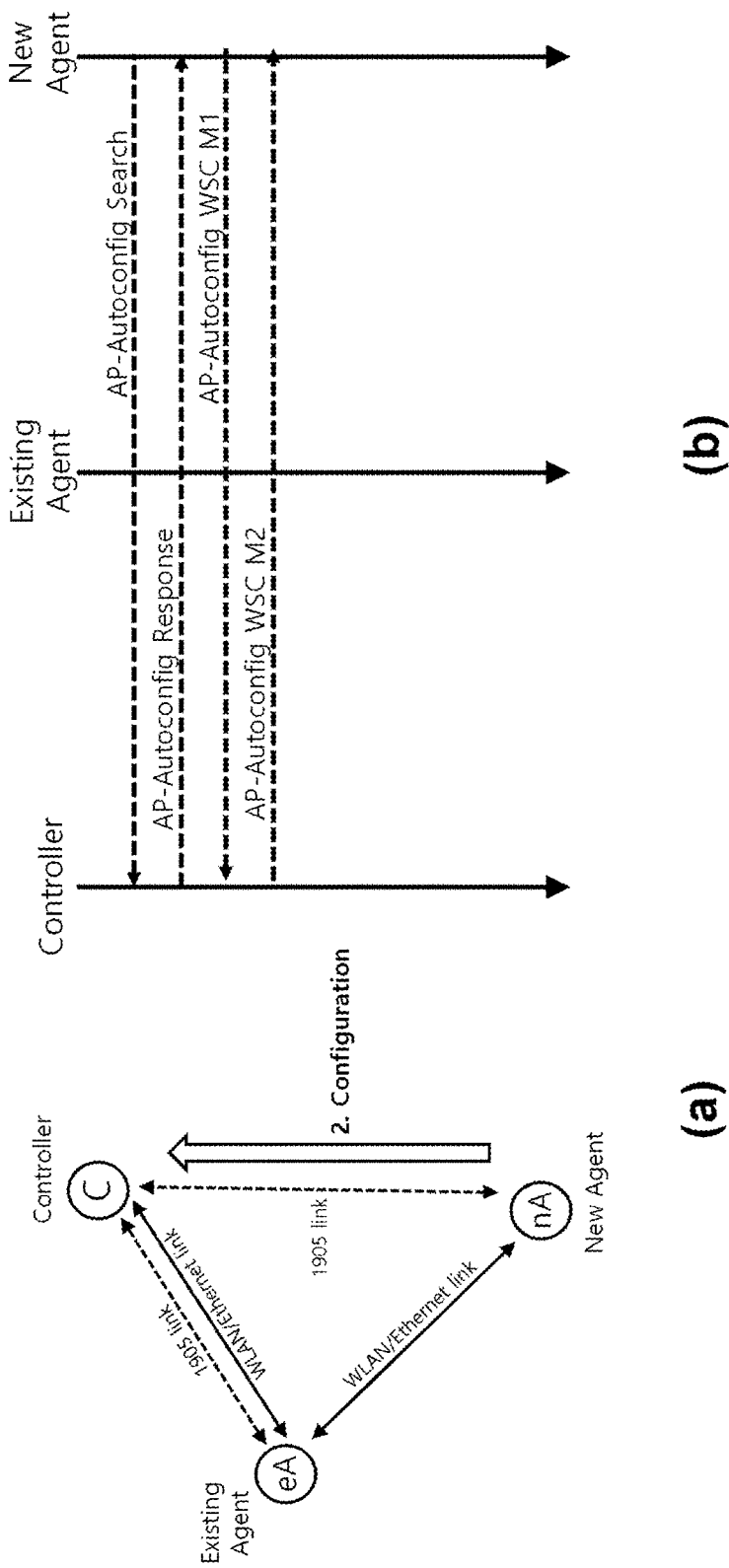
FIG. 8 shows a MAP configuration process according to an embodiment of the present disclosure.

FIG. 8 shows a MAP configuration process according to an embodiment of the present disclosure. FIG. 8(a) shows a connection relationship of a MAP device (New Agent) nA, that is, an enrollee, attempting to enroll in a MAP network, an existing MAP agent that has enrolled in the MAP network (Existing Agent) eA, and a MAP controller C of the MAP network. FIG. 8(b) shows the MAP configuration process of the enrollee nA.

The enrollee nA connected to the backhaul BSS and the backhaul link may use an AP-autoconfiguration message defined in the IEEE 1905 standard for MAP configuration. In this case, the backhaul link may be configured(set) through a wireless LAN link or an Ethernet link. Specifically, the backhaul link may be configured through the embodiment described with reference to FIG. 7. Specifically, the enrollee nA may transmit an AP-autoconfiguration Search message in a 1905 format to the MAP controller C through the backhaul link. In addition, the enrollee nA may encapsulate the AP-autoconfiguration Search message according to the protocol of the backhaul link being used. In addition, a search role of the AP-autoconfiguration Search message may be configured by the MAP controller. In this case, the MAP controller may transmit an AP-autoconfiguration Response message to the enrollee nA. Through this process, the enrollee nA and the MAC controller C may obtain an AL MAC address. The enrollee nA and the MAC controller C having obtained the AL MAC address may exchange M1 messages and M2 messages through AP-autoconfiguration WSC messages. Through this, the MAP controller C may transfer information required for the MAP configuration to the enrollee nA. Information required for the MAP configuration may include setting information in the fronthaul BSS.

The PBC-based onboarding described above requires the PBC event to be triggered on the enrollee and the MAP device in the MAP network. Therefore, when PBC-based onboarding is used, a user's action to trigger the PBC event may be required. In addition, for the WSC and the 1905 AP-autoconfiguration, a security protocol defined in a link on which the WSC and the 1905 AP-autoconfiguration are performed is used. In this case, security may become more vulnerable than when a separate security protocol is applied. Therefore, there is a need for a new MAP device onboarding method.

Figure 9:
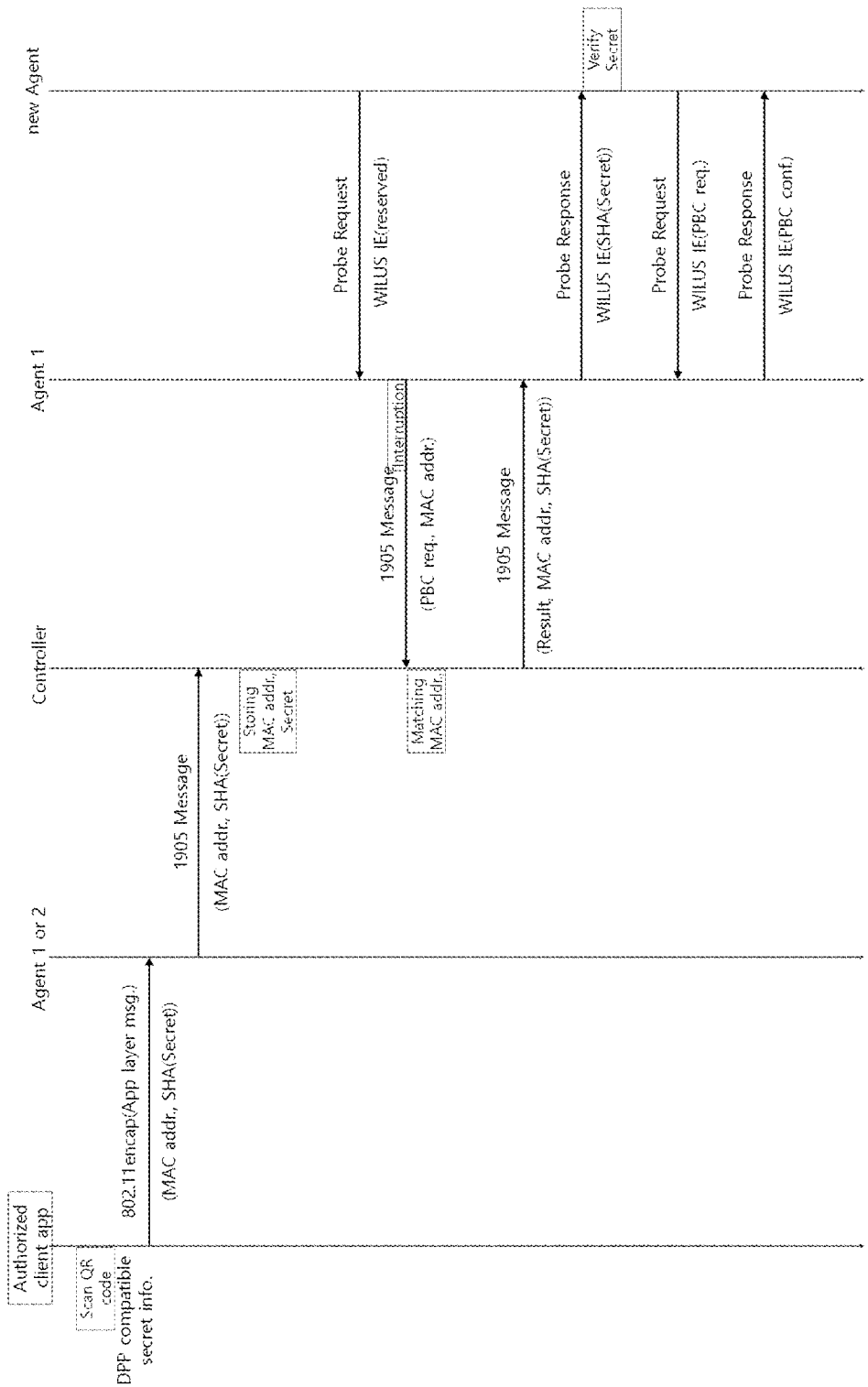
FIG. 9 illustrates an on-boarding method using an out-of-band scheme according to an embodiment of the present disclosure.

FIG. 9 illustrates an on-boarding method using an out-of-band scheme according to an embodiment of the present disclosure.

An on-boarding method using a conventional PBC scheme is conventionally and widely used for access of wireless LAN devices, but is inefficient in that a user is required to generate a PBC event a device for access through a physical or logical method. Furthermore, since there is no method by which opposite devices (e.g., eA and nA) may authenticate each other in a process of proceeding a PBC event, if a third device triggers a PBC event while the opposite devices trigger a PBC event, a device acting as a registrar like the eA illustrated in FIG. 7 cancels a connection by considering, as an error case, a case where multiple devices simultaneously attempt to access through PBC events. Therefore, in a case where a log agent continuously and intentionally triggers a PBC event, a connection through PBC in a corresponding region may be impossible.

Hereinafter, an on-boarding method for resolving the above problems of the conventional PBC scheme is proposed.

A user who owns a MAP network may install an application program for managing a MAP network in a personal terminal such as a smartphone. The application program may operate, based on an OS, such as Android, iOS, Windows, or Linux, and may be written, based on Web. This application program may send or receive an application layer message to or from a MAP controller (C), and may authenticate the user, based on pre-configured/stored login information. When the user logs in to the MAP network by means of the application program, the user may access a main server or web graphical user interface (GUI) of the MAP network through the application program, and may transfer information to the controller through an application layer message.

The user may access, through the application program, an initial wireless LAN SSID, which is provided by an AP managed by the controller (C) of the MAP network or including the controller (C), when the controller (C) starts to initially operate, and performs a mutual authentication with the controller (C) by using initially-configured login information in the corresponding network. In addition, at the time of initial access, the user may modify, through the application program, login information for access to the main server of the MAP network, and after the initial access to the main server, the user may store access information (e.g., an IP address or (AL) MAC information) for access to the server.

Moreover, the application program may obtain/acquire unique information of a new nA for security in an out-of-band type other than a wireless LAN when the nA attempts to on-board the MAP network, and may transfer the obtained/acquired information to the controller (C). The unique information may include identification information of a terminal, and specifically, may include a MAC address or a unique serial number of the terminal. In addition, the unique information may include unique code information of the terminal or a part thereof. The terminal is different from a personal terminal of the user, in which the application program is installed, and is a terminal (device or product) for on-boarding the MAP network, and may be expressed as an nA. The unique code information may be generated by a Base64-based code used in a conventional device provision protocol (DPP) protocol, and a different code generator may be used therefor. In addition, the code may be stored in a non-volatile memory of each terminal in the production of the terminal, and may be configured to be a value that does not change. The code and the identification information may be configured in a package type together with other protocol information, and pieces of terminal functional information, and the application program may obtain the package information. When the unique code information of the terminal is included in the package information, the information may be included after being re-configured in a type which only a terminal having an original code may understand/interpret. This is because there is a high possibility that unique code information of a terminal may be misused when leaked. For example, an original code to which a widely used hash function, such as SHA256, is applied may be included in the package information. In addition, the package information may be re-encrypted according to a pre-configured method in a type which the application program or the controller (C) may decode. In addition, a rule of generation avoiding a reserved value (e.g., a value allowing the same size fields to have all 0) indicating that there is no information at all may be applied when code or hashed code information is generated.

The package information may be provided in physically various types. For example, the package information may be generated to be a QR code having a pre-configured format, and may be attached to the terminal and the package of the terminal, and the application program has a function of scanning a QR code, and may obtain information related to the terminal through scanning the QR code. Alternatively, when the application program requests terminal-related information by using a different method (e.g., a method using NFC or Bluetooth) than QR code scanning, the terminal-related information may be provided. For example, when the power of a terminal (nA) that newly attempts to on-board the MAP network is turned on, and the user requests, through the application program, package information of the terminal by using a pre-configured Bluetooth or NFC signal, the terminal may transfer terminal information in the same transmission scheme (using a Bluetooth or NFC signal).

The application program having obtained the terminal information by using the above method may transfer the terminal information to the controller (C) or the main server of the MAP network. This terminal information may be transmitted in a pre-configured protocol in an application layer, and may include an indicator indicating that the terminal information is information inducing on-boarding of the terminal. In addition, in the package information, encryption in an application layer may be performed. In a case where multiple MAP networks may be managed through the application program, the user may also select which MAP network to which the terminal information is to be transferred through the application program.

Meanwhile, in a situation where the application program is unable to be connected to the controller (C) or the MAP main server, the application program may keep/store the terminal information, and may transmit the terminal information at a time point at which it is possible to connect to the controller (C) or the MAP main server. For example, in a case where a terminal and the MAP network may be connected through only an SSID of the MAP network when the MAP network includes a controller (C), when the application program has scanned a QR code of an nA before access to an SSID, the application program accesses a corresponding wireless LAN SSID, and then transmits package information to the controller (C).

The controller (C) having received a message (package information or terminal information) via the above method may decode a code applied to an application layer message or package information, and then obtain and store the package information. The controller (C) may configure a timer having a pre-configured value indicating a maximum time for which terminal information is kept/stored, and when the timer has expired, the controller may destroy the obtained/stored package information (terminal information).

According to an embodiment proposed in the present specification, a probe request/response message transmitted/received by agents supporting an on-boarding scheme, that is, devices for on-boarding a MAP network, includes a vendor-specific type information element (IE, WILUS IE illustrated in FIG. 9), and the agents may interpret an IE. The IE may include a field in which code information of an agent is inserted, and may include a field indicating a PBC request and identification state. In addition, agents may include WSC IEs in order to support conventional PBC scheme MAP on-boarding.

Specifically, when the user positions an nA at a desired point, and turns on the nA, the nA searches for a neighboring AP by transmitting a probe request message according to a conventional wireless LAN operation. Fields of a WILUS IE included in the probe request message are transmitted in a reserved state.

An eA having received the probe request message including the WILUS IE from the nA may transmit a 1905 message to the controller (C). The 1905 message may include identifier information such as a MAC address of the nA having transmitted the probe request message. A 1905 message described in the present specification may denote a message used/defined in IEEE 1905.1.

The 1905 message may be a periodically transferred message, such as a 1905 link metric report, which is transferred after an identifier is inserted therein in a vendor-specific type, length, and value (TLV) type, or may be a 1905 message newly defined for on-boarding. An indicator notifying that a new nA attempts to on-board may be included in the 1905 message. In addition, the 1905 message may be transmitted together with a frame body part of the probe request message having been transmitted by the nA, and together with received signal strength information of the probe request message.

The eA having received the probe request message including the WILUS IE may respond via a probe response message including a WILUS IE, but may transmit a message including only a WILUS IE not having separate information until a separate indication is received from the controller (C).

The controller (C) may receive 1905 messages notifying of nA access from multiple eAs. In a case where a MAC address of an nA included in the 1905 message matches one of MAC addresses included in package information transmitted from the application program of the user, the controller may select a particular one among the multiple eAs so as to proceed on-boarding of the nA. A backhaul link state between the controller (C) and the eA, and the received signal strength of a probe request message received by the eA from the nA in the 1905 message transmitted by the eA to the controller (C) may be considered. Thereafter, the controller (C) transmits a 1905 response message to the selected particular one eA. The response message may include a result bit indicating that on-boarding is allowed, and code-related information of the nA. The MAC address of the nA may be included therein again. If an original code of the nA is leaked from the code-related information, the original code may be misused. Therefore, in a case where the controller (C) has the original of the code-related information, the controller (C) may perform hashing of the code-related information by using an SHA function, and then transmit the hashed information to the eA. In a case where the controller (C) has only hashed code-related information, the controller (C) transfers the hashed code-related information to the eA. In addition, the controller (C) may also transmit, to non-selected eAs, 1905 response messages (frames) indicating that on-boarding is not allowed. The response message may include an indicator indicating that nA on-boarding is not allowed, and the MAC address of the nA. The eAs having received the response messages may not respond to a probe response message transmitted from the MAC address.

The eA having received the response message allowing on-boarding from the controller (C) may, when transmitting a probe response message to the nA, insert code information in the WILUS IE included in the probe request message received from the nA, and transmit same. Thereafter, the nA having received the probe response message may obtain a hashing value by applying the same hashing scheme as that applied by the controller (C), to the original of code-related information of the nA, and compare the hashing value with a code information value included in the WILUS IE. When the hashing value and the code information value coincide with each other, the nA may authenticate that the nA has received a response message from the MAP network which the nA wants to access. That is, in order to compare the hashing-scheme applied code-related information of the probe response message, and the code-related information of the nA, the nA obtains a hashing value by performing hashing of the code-related information of the nA by using the same hashing scheme as that used by the controller (C). Thereafter, the nA compares the hashing value with the code-related information included in the probe response message, and when the value and the information coincide with each other, the nA may identify that the a response message has been transmitted from the MAP network which the nA wants to access.

Thereafter, the nA may transmit, to the eA, a probe request message which is transmitted in a unicast scheme and includes a bit indicating a PBC event trigger, even if there is no separate trigger command/indication from the user. The bit indicating the PBC event trigger may be the same bit as that used in a conventional WSC IE, and may be a new bit which is separately defined and included in a WILUS IE, and two bits may be simultaneously used.

The eA having received the probe request message transmitted in the unicast scheme may transmit, to the nA, a probe response message including pieces of configuration information related to a PBC event in response to the probe request message. Similarly, the probe response message may include a WILUS IE. In other words, the eA having received the probe request message transmitted in the unicast scheme may transmit, in response thereto and to the nA, a probe response message which is transmitted in a unicast scheme and includes a bit indicating a PBC event trigger. The bit indicating the PBC event trigger may be the same bit as that used in a conventional WSC IE, and may be a new bit which is separately defined and included in a WILUS IE, and two bits may be simultaneously used.

The eA having triggered a PBC event through the probe response message transmitted in the unicast scheme does not proceed a PBC event with a terminal (another nA) having a different MAC address until the PBC with the nA is ended or canceled.

The nA having performed the above operations, that is, having transmitted/received a probe request/response message related to a PBC event trigger, may transmit/receive a fronthaul authentication request/response message illustrated in FIG. 7, and perform a subsequent process.

A terminal according to the present embodiment basically implements a PBC procedure, and thus even in a case of physically triggering a PBC event according to a general scheme, the terminal may proceed on-boarding by using a conventional PBC event. In addition, the PBC procedure requires the same user operation and a code scheme having the same protocol as those of a DPP procedure which next-generation MAP devices follow, and thus, in terms of user experience, inconvenience which may occur at the time of conversion to a next-generation terminal may be minimized.

Figure 10:
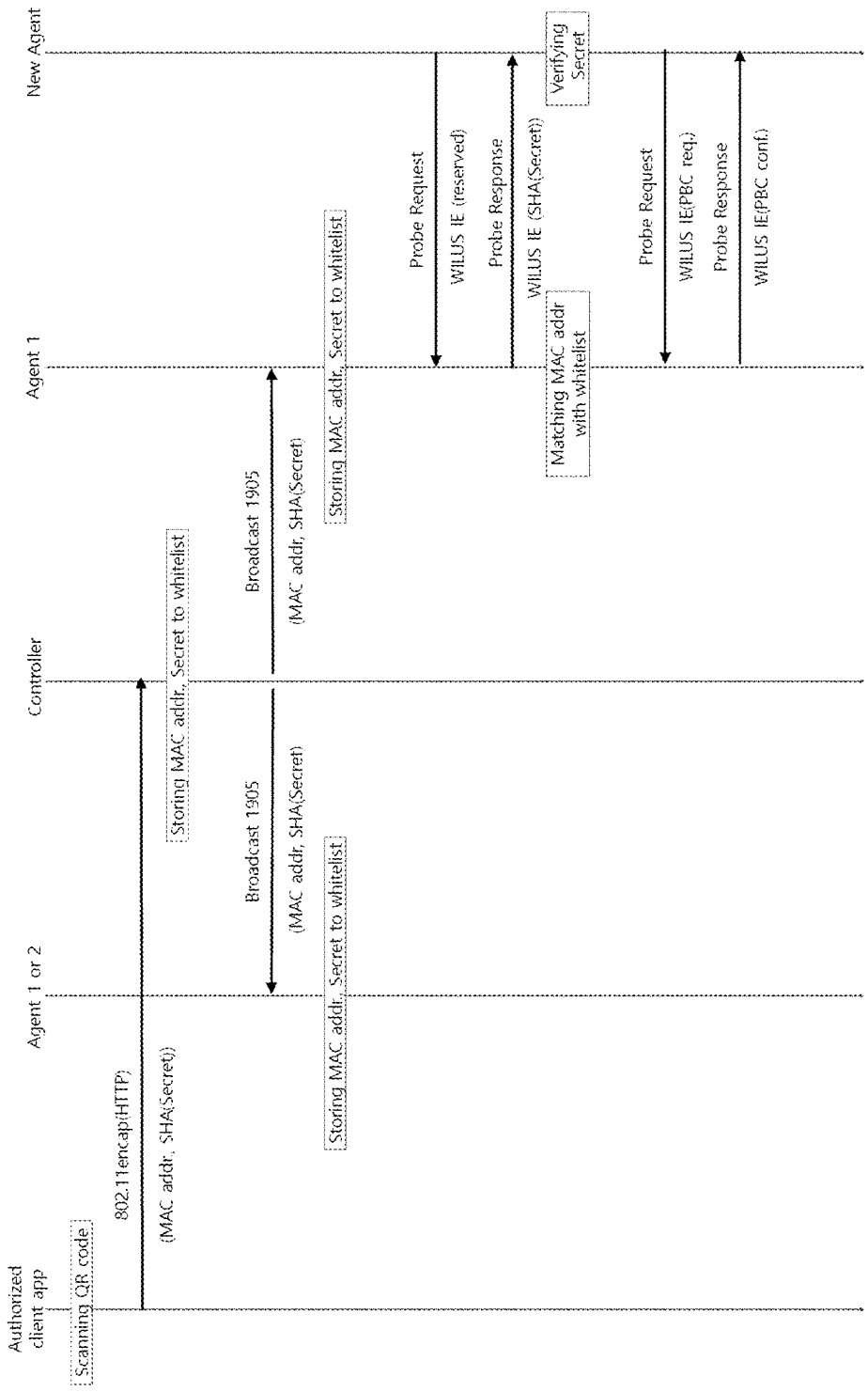
FIG. 10 illustrates an on-boarding method using an out-of-band scheme according to another embodiment of the present disclosure.

FIG. 10 illustrates an on-boarding method using an out-of-band scheme according to another embodiment of the present disclosure.

That is, FIG. 10 is a diagram illustrating another embodiment in which an application program transmits package information to a controller (C), and then a terminal proceeds on-boarding, as described with reference to FIG. 9.

In the on-boarding procedure described with reference to FIG. 9, the controller (C) solely manages package information. Therefore, the same procedure has an advantage in that the controller (C) may select an eA to proceed on-boarding, through a centralized determination as a MAP network management subject. However, there may be a delay from reception of, by eAs, first probe request messages to reception of, from the controller (C), a 1905 response message for executing on-boarding. Therefore, a procedure of completing on-boarding between an nA and an eA is required to reduce the on-boarding delay. Hereinafter, a specific operation procedure will be described.

Referring to FIG. 10, a controller (C) acquires package information, and then transmits the package information to all eAs in the same MAP network, and the eAs having received same store the package information in a white list type. A message including the package information may be a message in a vendor-specific type following a 1905 message format, or may be a periodically transmitted 1905 message having a vendor-specific TLV added thereto.

Thereafter, similarly as described with reference to FIG. 9, when the power of an nA is connected, and then the nA transmits probe request messages to eAs, eAs having received same may respond via probe response messages including WILUS IEs. The eAs may not separately transmit, to the controller (C), 1905 messages indicating the nA attempts to on-board.

Hereinafter, a specific method for selecting a particular eA which the nA is to access, so as to prevent multiple eAs from triggering PBC events will be described. The nA records a channel and a MAC address including a WILUS ID among probe response messages received after transmitting broadcast probe request messages in channels subjected to an attempt of scanning, and then selects an eA to be accessed, according to a pre-configured method. The pre-configured method may be configured by considering AP capability and a signal strength recorded when the nA receives the probe response message.

The nA having selected an eA for attempting to on-board may switch to a channel of the nA, and then transmit a unicast probe request message. When a unicast probe request message is received from the nA, the selected eA identifies whether a MAC address of the nA is included in a white list. When the MAC address of the nA transmitting the probe request message and a MAC address included in the white list coincide with each other, the eA includes code information in a WILUS IE included in a probe response message, which is a response message relative to the probe request message, and transmits same.

Thereafter, by using the above method, the nA may obtain a hashing value by applying the same hashing scheme to the original of a code, and compare the hashing value with a code information value included in the WILUS IE. When the hashing value and the code information value coincide with each other, the nA may authenticate that the nA has received a response from the MAP network which the nA is to access. Thereafter, the nA transmits, to the selected eA, a probe request message which is transmitted in a unicast scheme, and includes a configured bit which may indicate a PBC event trigger even without a user's artificial trigger, and proceeds to on-board by using the above method.

The AP including the controller (C) and APs including one or more agents may be connected to each other through a backhaul link so as to distribute data between APs in a MAP network system as illustrated in FIG. 5 when on-boarding of the nA is completed. A particular RF of an AP may be reserved by a backhaul link. The other RFs than the particular RF may be reserved by a fronthaul BSS for participation of, in a network, a client. In addition, a backhaul link and a fronthaul BSS may be implemented at the same RF. An AP device may operate two or more BSSs at the same time. Roaming to another BSS in a MAP network rather than the currently connected BSS may be induced by considering a channel change and a BSS load when a client physically moves. Roaming described in the present specification may have the same meaning as steering.

Client roaming has been discussed even in a system other than a MAP network as well as a MAP network system, and a client roaming subject is determined by a client. In the IEEE 802.11k standard for radio resource management (RRM), only limited information is provided to a client to make a decision about roaming. In a case where a MAP network system is used, more information may be collected by a MAP controller. Therefore, a client may roam to another BSS determined using additional information.

APs configuring the same MAP network use the same SSID, and the same access security scheme. Therefore, a client may recognize the entire MAP network as one wireless profile, but is actually connected to one BSS among MAP devices having the same SSID.

Client roaming is to make the client to access a network having the best quality. When a client moves physically, the controller (C) may determine a BSS capable of providing the best performance to a corresponding client by using the information that the controller has, as necessary. For example, in a case where a client connected to a MAP network supports a BSS transition management (BTM) in the IEEE 802.11v standard, the controller (C) may select a BSS capable of providing the best performance, and requests the client to roam thereto. If a client does not support a BTM, other BSSs available in the network blocks the client from accessing same, and only BSS recommended (capable of providing the best performance) by the controller (C) allows access, and thus the client may roam to a BSS capable of providing the best performance.

Figure 11:
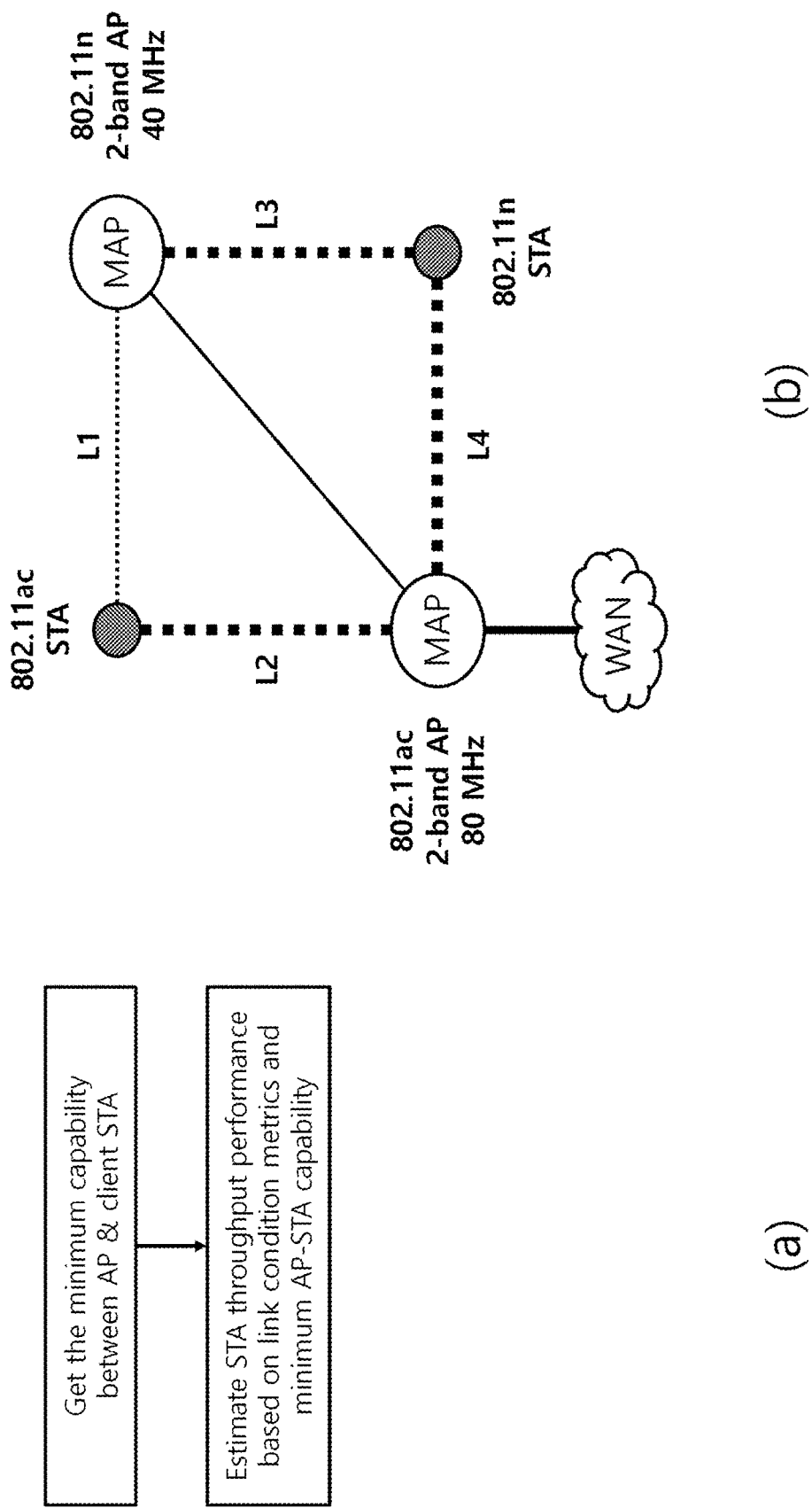
FIG. 11 illustrates access points having different capabilities and clients connected to the access points according to an embodiment of the present disclosure.

FIG. 11 illustrates access points having different capabilities and clients connected to the access points according to an embodiment of the present disclosure.

FIG. 11(*a*) illustrates a process of estimating throughput of a client (e.g., STA). Specifically, a controller (C) obtains a low capability between an AP capability and a client capability. The controller (C) estimates an STA throughput, based on line condition metrics and the obtained capability.

FIG. 11(*b*) illustrates a multiple AP network including devices having different capabilities. A controller (C) is required to consider both an AP capability and a client capability in order to select a BSS subjected to client roaming. For example, a MAP device having the highest capability is connected to a WAN, and a MAP device having a relatively low capability is connected to the MAP device having the high capability through a backhaul, so that costs may be saved.

Referring to FIG. 11(*b*), a device supporting the 802.11n standard may support a 40 MHz channel bandwidth, and a device supporting the 802.11ac standard may support a 80 MHz channel bandwidth. Therefore, a client (STA) supporting 802.11n may receive a service having the same performance regardless of being connected (L4) to a MAP device supporting 802.11ac, or being connected (L3) to a MAP device supporting 802.11n. In a case where a BSS for client roaming is selected in consideration of only capability of MAP devices, even when a performance received by an actually roamed client is not improved, a BSS of a MAP device having a higher capability may be selected as a BSS for client roaming. In other words, regardless of client capability, a BSS having a relatively high capability may be selected as a BSS for client roaming. The client (STA) supporting 802.11n may receive a service having a better performance when being connected (L2) to the MAP device supporting 802.11ac than when being connected (L1) to the MAP device supporting 802.11n.

Figure 12:
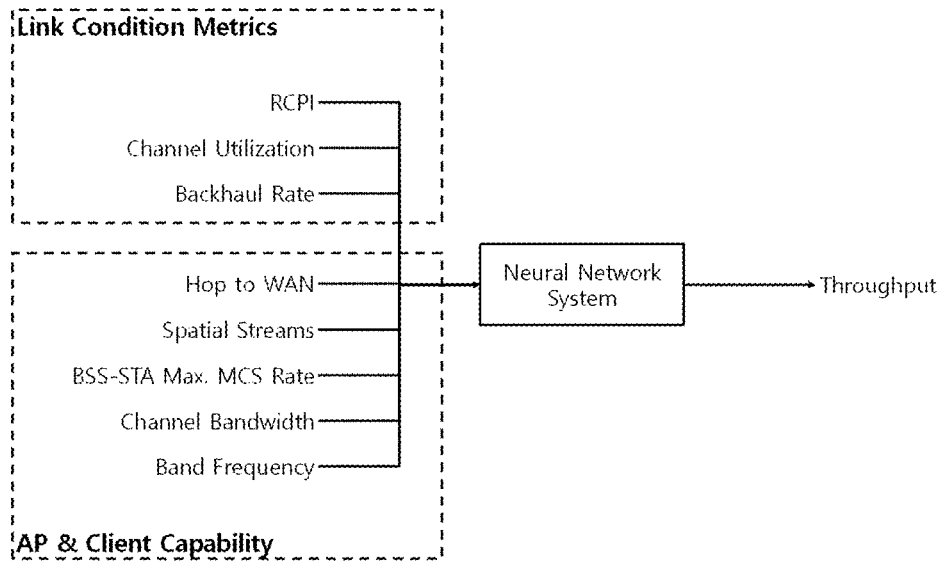
FIG. 12 illustrates parameters used to estimate a throughput between a client and a MAP device connected to a WAN in a multiple access point network according to an embodiment of the present disclosure.

FIG. 12 illustrates parameters used to estimate a throughput between a client and a MAP device connected to a WAN in a multiple access point network according to an embodiment of the present disclosure.

A controller (C) may collect a link condition metric related to a connection state of a channel which is being used by each of BSSs configuring a MAP, a client capability, and an AP capability. The link condition metric and the capability may differently affect estimating a throughput. As an example of a method for estimating a throughput proposed in the present specification, a forward neural network using, as an input, the link condition metric and the capability may be used. Specifically, referring to FIG. 12, a forward neural network estimates a throughput through eight input parameters. The eight input parameters may be generally divided into two types of parameters such as a parameter related to the link condition metric and a parameter related to the capability. The link condition metric denotes a dynamic parameter which is changeable over time, and the capability denotes a static parameter which is unchangeable over time. The parameter related to the link condition metric may include a received channel power indicator (RCPI), channel utilization, and a backhaul rate, and the parameter related to the capability may include spatial streams, a channel bandwidth, a BSS-STA Max. modulation and coding scheme (MCS) rate, and hops to WAN.

Hereinafter, each parameter will be described in detail.

The RCPI is a parameter indicating a received signal strength between an AP and a client in a BSS rather than relatively measuring a signal strength like a received signal strength indicator (RSSI). The RCPI is higher when a client is close to an AP than when a client is far away from an AP, and may be affected by an obstacle between an AP and a client. That is, the value of the RCPI may be determined according to the distance between an AP and a client, and existence or non-existence of an obstacle.

The channel utilization is a parameter related to an amount by which a channel is used, that is, a usage rate of a channel. Specifically, since a wireless communication system transfers data via an RF, a corresponding channel is busy while a particular terminal transmits a packet, and another terminal is unable to use the same channel (the channel which is busy to transmit the packet) at the same time. The value of the channel utilization may be determined based on a value obtained by measuring the total busy time of a corresponding channel. For example, when the value of the channel utilization is large, this implies that a time slot which a client may transmit through a corresponding channel is limited, and an estimated throughput may be expected to be low. The estimated throughput denotes a throughput expected using the above parameters.

The backhaul rate is a parameter indicating an estimated MAC data rate at the reception side of a backhaul link. A MAP network uses a backhaul link for communication between APs. When a channel selected as a backhaul link is busy (is being used), data communication using a backhaul link may be limited, and thus an estimated throughput may be negatively affected.

The spatial streams, the channel bandwidth, the BSS-STA Max. MCS rate, and hops to WAN, which are parameters related to the capability, directly affect the maximum throughput.

The BSS-STA Max. MCS rate indicates a maximum value of a MCS-specific data rate between a BSS and a STA, and is considered as a theoretical maximum throughput.

A band frequency is a parameter used to predict the estimated throughput. Data transmission using a 2.4 GHz frequency band is less affected by an obstacle, and has a wider coverage. Meanwhile, data transmission using a 5 GHz frequency band has a higher throughput, but has a narrow coverage.

Hops to WAN is a parameter indicating a connection state between a BSS and a WAN.

Specifically, the parameter may be determined according to whether a (backhaul) connection from a BSS to an AP connected to a WAN is established by wire or wirelessly. Moreover, when the connection is a wireless connection, the parameter may be determined according to whether the wireless connection is a backhaul-dedicated connection or a connection sharing a fronthaul. In addition, hops to WAN may be a parameter determined based on the distance between a BSS and a MAP device connected to a WAN.

The estimated throughput may be predicted via a neural network system using the above eight parameters.

Figure 13:
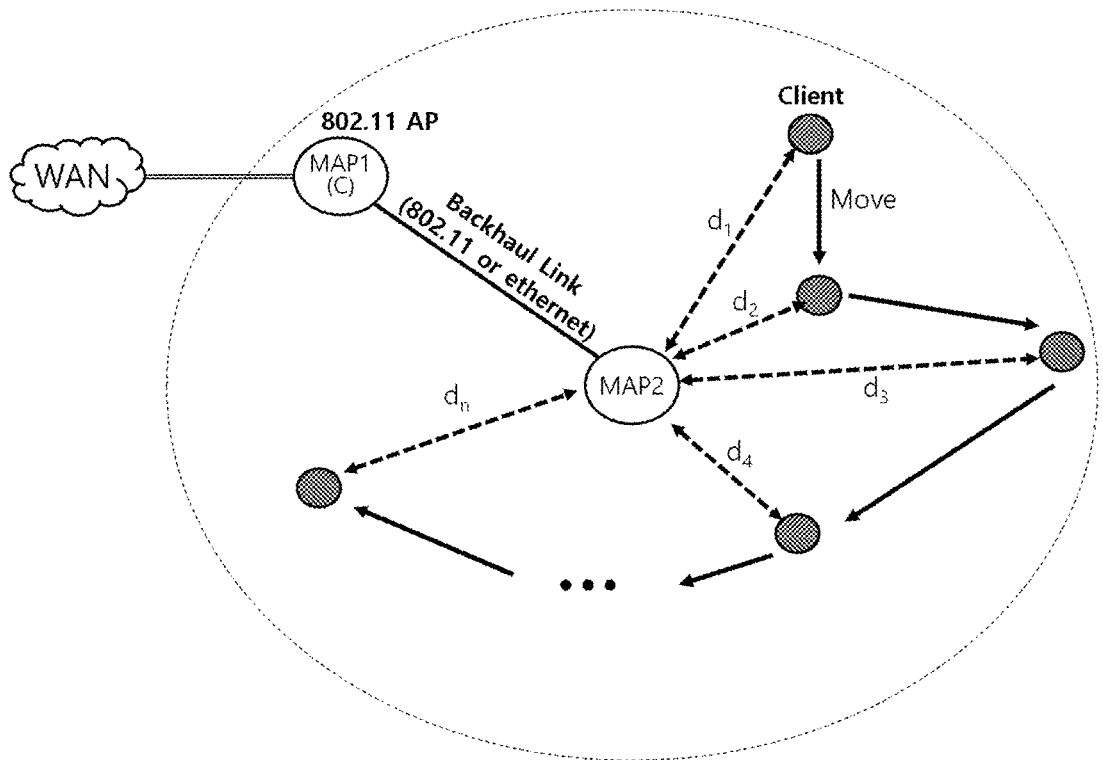
FIG. 13 illustrates a method for collecting a data set used to estimate a throughput according to an embodiment of the present disclosure.

FIG. 13 illustrates a method for collecting a data set used to estimate a throughput according to an embodiment of the present disclosure.

A data set is required to be collected/obtained in consideration of all scenarios available for an AP and a client.

Referring to FIG. 13, the location of an AP is fixed, and the parameters described with reference to FIG. 12 are collected while the location of a client is changing. At the same time, a throughput between the client and an associated BSS is required to be measured and collected/obtained together. The associated BSS indicates a BSS including a client-associated AP. Traffic generated by measurement of the throughput is required not to be affected by an external factor such as a server load or server latency. The traffic may indicate traffic between a MAP device including a controller (C) and the client. The traffic is required to enable accomplishment of a maximum throughput.

Furthermore, measurement of data is required to be performed at various locations. That is, as illustrated in FIG. 13, as the location of the client changes, the distance (d1, d2, . . . , dn) between the client and a MAP device may change, and data measurement is required to be performed at the changed locations. The measured and collected throughput may be configured into a single item by being mapped to the parameters described with reference to FIG. 12 so as to train a neural network model. The above forward neural network model is trained through these data.

A BSS identification method described in the present specification is implemented and performed in a general AP. Therefore, a neural network for regression may be used as a simple model which is efficient in terms of implementation. A pre-trained model may be used due to complexity of calculation and a memory in an AP.

Figure 14:
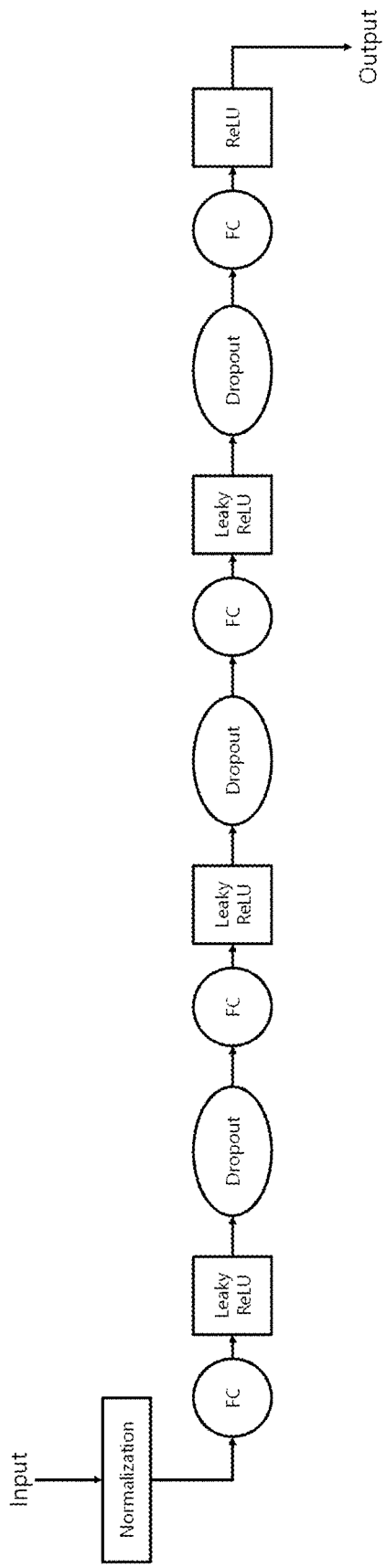
FIG. 14 illustrates a structure of a forward neural network for estimating a throughput according to an embodiment of the disclosure.

FIG. 14 illustrates a structure of a forward neural network for estimating a throughput according to an embodiment of the disclosure.

Input parameters of the forward neural network are the same as the eight parameters described with reference to FIG. 12. The parameters may have different units and ranges. Normalization may be applied to balance the influence exerted by a particular parameter having a relatively large value according to a parameter unit and range. Parameter normalization may be accomplished by a standard score (Z-score).

The input parameters may have different linear or non-linear influences to an estimated throughput. A neural system is required to employ non-linear relation so as to process all the linear or non-linear type of influences. In the first fully connected (FC) layer, a leaky rectified linear unit (LeakyReLU) activation function is applied. The activation function provides a linear function, the inclination of which is greater than 0 and less than 1 with respect to an input less than 0, and provides a linear function, the inclination of which is 1 with respect to an input of 1 or greater. A dropout layer is applied after the FC layer so as to prevent overfitting. The forward neural network model uses multiple hidden layers, and thus may extract more features from an input parameter and learn same.

In the last FC layer, a ReLU activation function is applied. This may be used to prevent a throughput calculated in the neural network from having a negative value. In an out layer, a single neuron is used to combine, into a single output, the features found from the previous last FC layer.

The neural network model may be implemented by a machine learning framework such as a TensorFlow framework, a Keras framework, or a PyTorch framework may be implemented in a system operated by an AP, and may be implemented as a backend element of a WLAN monitoring and management system.

Figure 15:
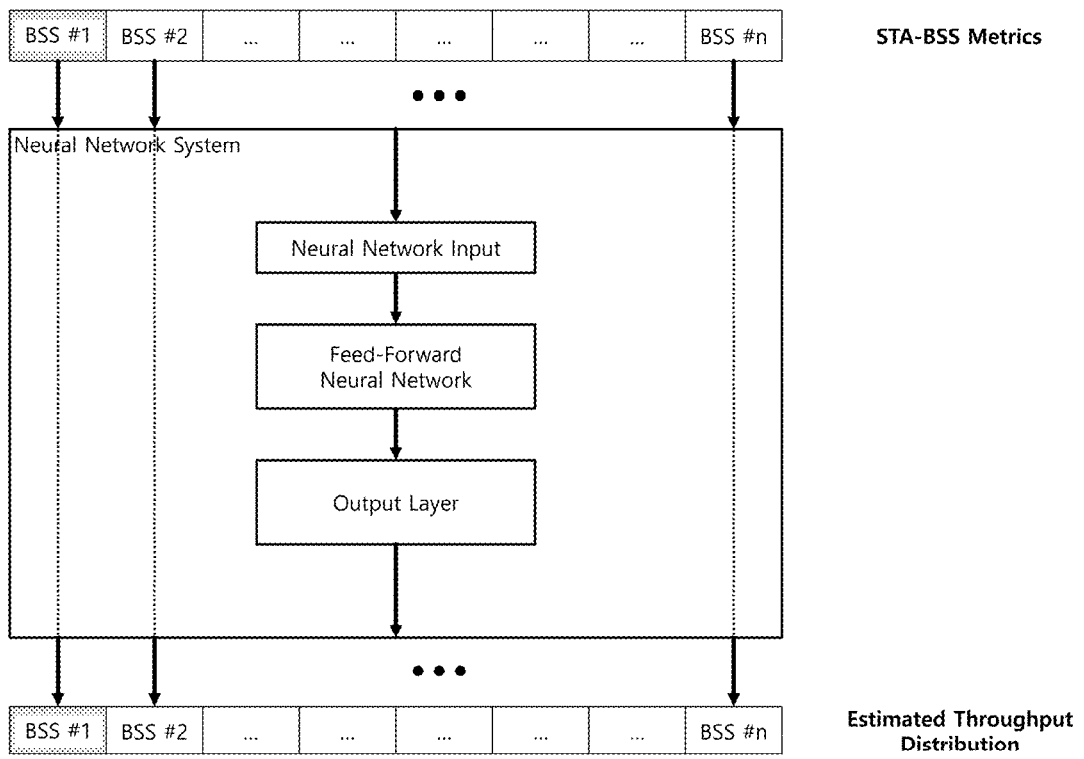
FIG. 15 illustrates a process of calculating, through a neural network, an estimated throughput when a client is included in each BBS according to an embodiment of the disclosure.

FIG. 15 illustrates a process of calculating, through a neural network, an estimated throughput when a client is included in each BBS according to an embodiment of the disclosure.

A client predicts an estimated throughput by using a forward neural network, and the parameters described with reference to FIG. 12 may be used as input values. A MAP controller collects information of all BSSs in a MAP network, and uses the collected information in order to select a BSS for client roaming. The controller (C) collects information of an associated BSS and an unassociated BSS. The associated BSS indicates a client-associated BSS, and the unassociated BSS indicates a BSS which is not associated with a client for roaming in the MAP network. When the controller (C) collects the capabilities of all APs/BSSs included in the MAP network, and metrics between the client and an AP operating a BSS for client roaming, the collected information is input as an input value of the forward neural network. The controller (C) estimates a maximally accomplishable throughput of an AP with respect to the client in each of the BSSs in the MAP network. The BSSs may exist at different locations and may have different capabilities. These differences are considered with respect to an input parameter, and an estimated throughput may reflect all the differences.

In other words, the controller (C) obtains a parameter related to a link condition metric between the client and an AP of each BSS, and a parameter related to AP/BSS capability from each of the BSSs included in the MAP network, inputs the obtained parameters as input values of the forward neural network, and calculates/obtains an estimated throughput when the clients has roamed to each BSS. The estimated throughput may be a downlink throughput or an uplink throughput of an AP operating the BSS.

Figure 16:
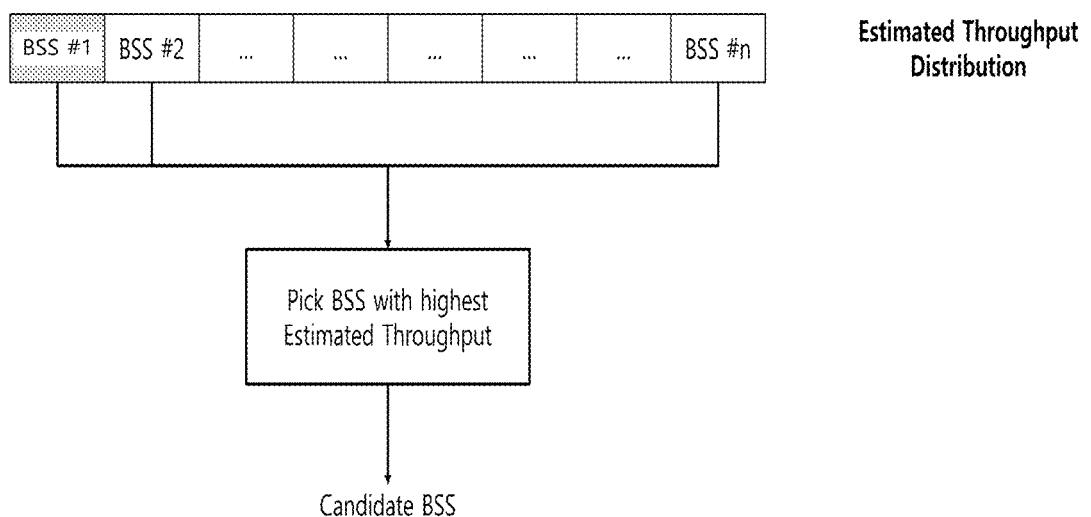
FIG. 16 illustrates a method for selecting a BBS for roaming of a client according to an embodiment of the present disclosure.

FIG. 16 illustrates a method for selecting a BBS for roaming of a client according to an embodiment of the present disclosure.

As described with reference to FIG. 15, by using a neural network system, a controller (c) may calculate the estimated throughputs of all available BSSs included in a MAP network when a client is associated with the BSSs, and may store the calculated estimated throughputs in a data array. Thereafter, the controller (C) may select one or more BSSs as BSSs for client roaming, and the selected BSSs (candidate BSSs) may have the highest estimated throughput.

In a MAP network, there is only one connection link with a WAN. Therefore, each of multiple APs may be connected to the WAN through multiple hops. In other words, a hop may indicate the distance from the WAN to an AP. Therefore, the controller (C) may separately consider the number of hops in order to predict an estimated throughput.

Figure 17:
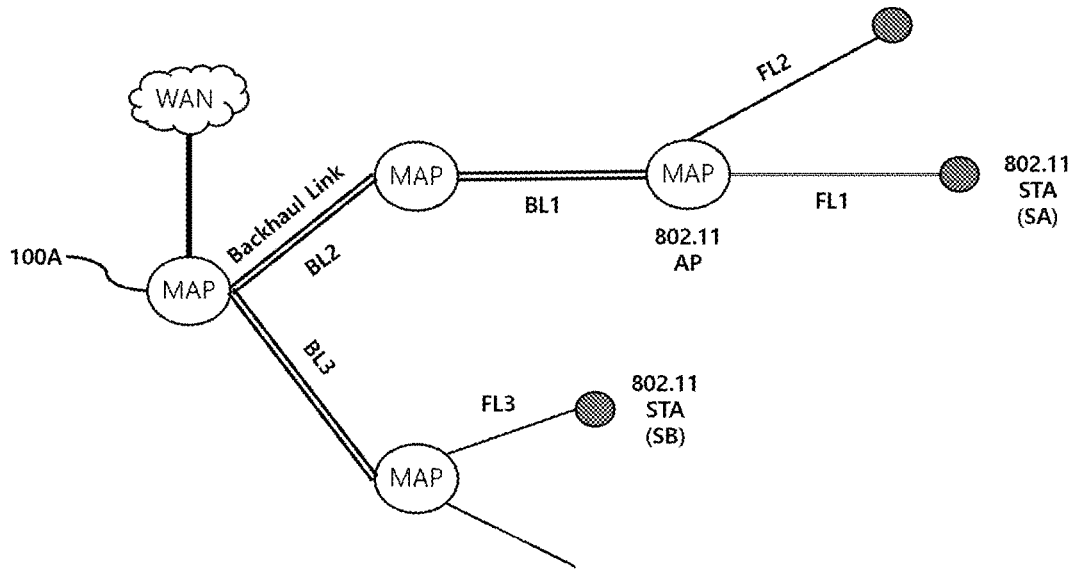
FIG. 17 illustrates a configuration topology between multiple access points and a client according to an embodiment of the disclosure.

FIG. 17 illustrates a configuration topology between multiple access points and a client according to an embodiment of the disclosure.

The throughput of each of all client-associable BSSs may be calculated, and an estimated throughput may be predicted according to the distance (the number of hops) between a MAP device 100A connected to a WAN and an AP operating each BSS. In other words, a throughput when a client is associated with a BSS may be first predicted by using the remaining parameters except for the number of hops, and an estimated throughput may be predicted by considering the number of hops with respect to the predicted throughput. That is, a two-stage process may be performed to predict an estimated throughput. A throughput is predicted by using the remaining parameters except for the hops to WAN parameter (first stage), and an estimated throughput is predicted by considering the hops to WAN parameter in addition to the predicted throughput (second stage).

MAP devices included in the MAP network are connected through a backhaul link. The backhaul link may be wirelessly connected, and the number of wireless interfaces of an AP is limited. Therefore, a backhaul link and a fronthaul link may be configured via the same RF. In this case, the same RF channel is used, and thus the performance may degrade. All channel information used between the client and the MAP device 100A are required be considered to adjust an estimated throughput according to performance degradation. Specifically, when channels used for link connections overlap with each other, an estimated throughput may be calculated by applying a penalty of (N−1)/N. N indicates the number of overlapping channels. For example, in FIG. 17, a client SB is connected to the MAP device 100A through one fronthaul link FL3 and one backhaul link BL3. When FL3 and BL3 are connected using different channels, a penalty is not applied when an estimated throughput is predicted. An SA is connected to the MAP device 100A through one fronthaul link FL1 and two backhaul links BL1 and BL2. In a MAP network topology, a wireless interface used as a backhaul STA may be used as a backhaul AP for a different backhaul STA. In other words, in FIG. 17, BL1 and BL2 are the same channel, and the SA and the MAP device 100A may be connected to each other therethrough. In FIG. 17, an STA is expressed as a roaming subject, but this also means a client.

For example, in a case where BL1 and BL2 use the same channel, and FL1 uses a different channel, a penalty of (2−1)/2, that is, ½ (50%) is required to be applied when an estimated throughput is predicted through FL1. In a case where BL1, BL2, and FL1 use the same channel, a penalty of (3−1)/3, that is, ⅔ (66.7%) is required to be applied.

Figure 18:
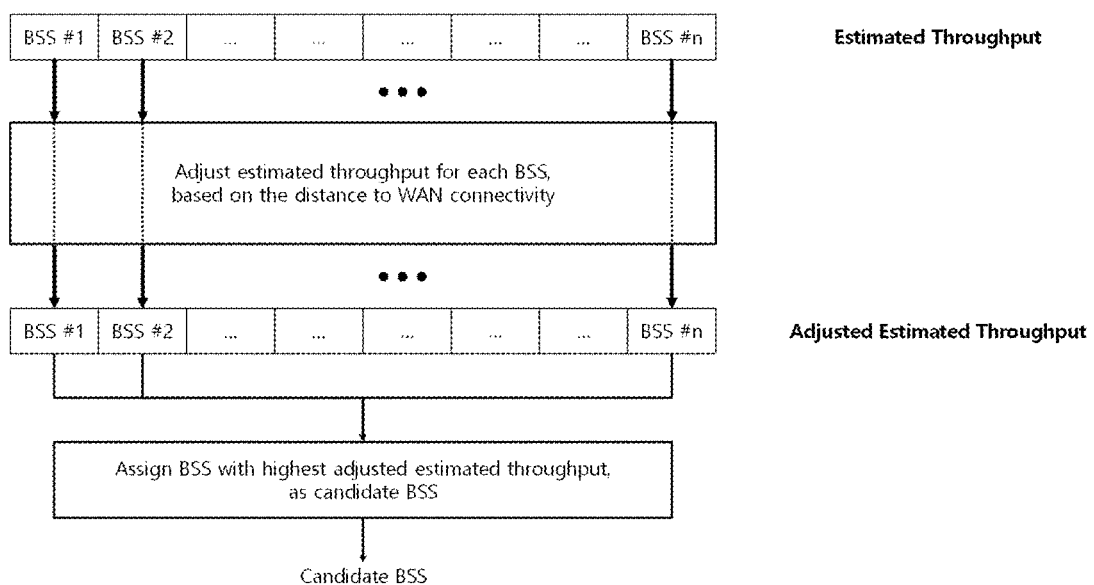
FIG. 18 illustrates a process of calculating, through a neural network, an estimated throughput when a client has roamed to a BBS according to another embodiment of the disclosure.

FIG. 18 illustrates a process of calculating, through a neural network, an estimated throughput when a client has roamed to a BBS according to another embodiment of the disclosure.

In a case where all the above eight parameters including the hops to WAN parameter are used as input values of a neural network model so as to predict an estimated throughput, the capability of an AP providing a dual band and an AP providing a tri-band may not be properly considered. For example, an AP providing a tri-band may use a particular band as a backhaul-dedicated link, and may use the two other bands as fronthauls. Meanwhile, in a case where an AP providing a dual band uses two bands as fronthauls, at least one band shares a backhaul link and a fronthaul link. Therefore, even in a case of the same hops to WAN, different performances may be shown. Therefore, it is required that an estimated throughput is predicted by using, as input values, the remaining parameters except for the hops to WAN parameter, and then an adjusted estimated throughput is predicted using, as an additional input value, hops to WAN. Therefore, hereinafter, a process of predicting an adjusted estimated throughput will be described using FIG. 18.

If the number of APs included in a MAP network is one, a MAP network connected to a WAN is the one AP, and thus the number of hops (hops to WAN) may not be considered.

FIG. 18 illustrates that an estimated throughput for each BSS, which is predicted using the above neural network may be adjusted again in consideration of the number of hops (the hops to WAN parameter) between a client and a MAP device connected to a WAN.

That is, the downlink throughput of an AP when a client has roamed to each of all client-associable BSSs may be calculated, and an adjusted estimated throughput may be predicted according to the distance (the number of hops) between an AP connected to a WAN and an AP operating each BSS. In other words, a controller (C) may first predict a downlink throughput of an AP relative to a client in a BSS by using the remaining parameters except for a parameter (hops to WAN) indicating a connection state with a WAN among the above eight parameters, and an adjusted estimated throughput may be predicted by additionally considering a parameter indicating a connection state with a WAN with respect to the predicted throughput. That is, the controller (C) may perform a two-stage process to predict an estimated throughput, and the throughputs of all client-associable BSSs are predicted by using the remaining parameters except for the hops to WAN parameter (first stage), and an adjusted estimated throughput is predicted by considering the hops to WAN parameter with respect to the predicted throughput (second stage). The above neural network system (model) may be used to predict a throughput in the first stage and the second stage, and a neural network system used in the first stage, and a neural network system used in the second stage may be different from each other.

The (adjusted) estimated throughput may be a downlink throughput or an uplink throughput of an AP operating the BSS.

An estimated throughput (first stage) before considering the number of hops between the MAP device and the client may be predicted to be high, but the value of an estimated throughput (second stage) adjusted in consideration of the number of hops may be lower than the estimated throughput calculated in the first stage. The controller (C) selects a BSS having the highest value among the adjusted estimated throughputs (second stage) as a BSS for client roaming.

The selected BSS (candidate BSS) may be connected to the client, and a client roaming request may not occur at this time. However, in a case where a client roaming request occurs even though the selected BSS (candidate BSS) is connected to the client (in a case where a BTM request frame is transmitted to a client supporting the 802.11v standard), the client may disassociate the client from the currently associated BSS (parent BSS) in response to a roaming request, and associate the client with the currently associated BSS (parent BSS) again. This may cause stop of data traffic without actual roaming. Moreover, the controller (C) may not request client roaming to prevent frequent roaming when the difference between the estimated throughput of the BSS currently associated with the client and the estimated throughput of the selected BSS (candidate BSS) is equal to or lower than a predetermined level. In other words, client roaming is performed only when the difference between the throughput of the BSS currently associated with the client and the estimated throughput of the selected BSS (candidate BSS) is equal to or higher than a pre-configured standard.

Figure 19:
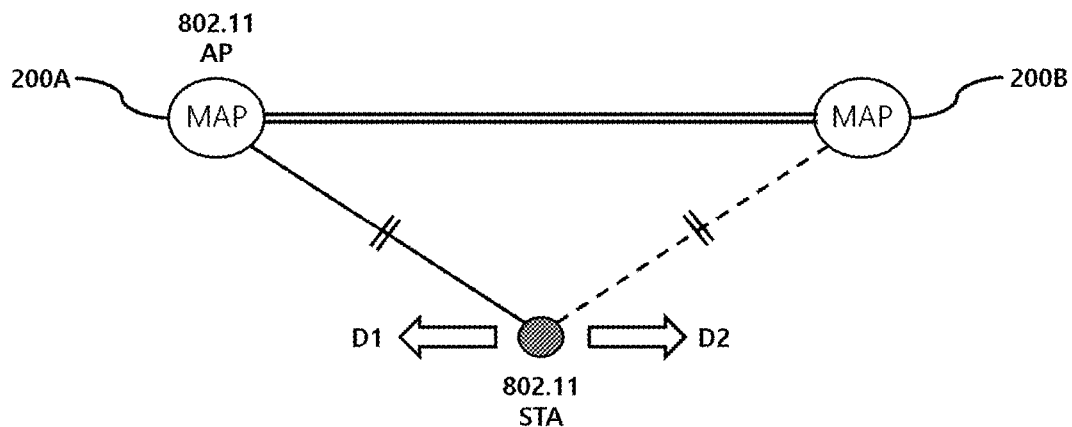
FIG. 19 illustrates a situation where a client has roamed according to an embodiment of the present disclosure.

FIG. 19 illustrates a situation where a client has roamed according to an embodiment of the present disclosure. That is, FIG. 19 illustrates a situation where frequent roaming of a client may occur.

An adjusted estimated throughput of a BSS (candidate BSS) which is selected based on an adjusted throughput predicted considering the number of hops, as described above, may be similar to an adjusted estimated throughput of the currently associated BSS (parent BSS). A metric (i.e., an input value (parameter) for predicting an adjusted estimated throughput) may slightly change due to a measured noise and the other reasons, and an adjusted estimated throughput may also slightly change accordingly. In this case, if a performance gain threshold is not considered, performance degradation may occur in that data traffic is interrupted due to frequent roaming even when there is no large improvement of the performance (quality).

For example, as illustrated in FIG. 19, if a client is located to be the same distances away from two MAP devices 200A and 200B, and the two MAP devices 200A and 200B have the same capabilities, the adjusted estimated throughputs of the two MAP devices 200A and 200B may be predicted to be similar (or identical) to each other. When the client moves in a D2 direction while being connected to the MAP device 200A, the adjusted estimated throughput of the MAP device 200B may be predicted to be slightly higher, and the client may attempt to roam to a BSS of the MAP device 200B. Traffic may stop for a moment in a disconnection and re-connection process for roaming.

The BSS for client roaming may be a BSS having heavy interference. In this case, the client disassociates from the current BSS, and attempts to associate with the BSS having heavy interference, but the client may continuously fail to associate the new BSS due to the heavy interference, and may be eventually connected again to the BSS (i.e., parent BSS) which has been disconnected.

Client roaming is performed to provide the best performance (quality) to a client, but too frequent roaming requests may reduce the performance. In other words, although there is a small improvement of the performance because of small difference between the estimated throughput of the currently associated BSS (parent BSS) and the estimated throughput of the selected BSS (candidate BSS), data traffic may stop due to frequent roaming.

In order to resolve this problem, a performance gain may be considered before a roaming request. That is, if the adjusted estimated throughput of the selected BSS (candidate BSS) does not satisfy a performance gain threshold value reflecting a performance gain, a roaming request may not be performed. The performance gain value is required to be adaptive. When the adjusted estimated throughput of the currently associated BSS (parent BSS) is high, a performance gain value increases, and thus a performance gain threshold value is required to be increased. For example, in a case where the adjusted throughput of the selected BSS (candidate BSS) is high (an AP has a high capability), when a performance gain value is configured to be a low constant value, the adjusted throughput of the selected BSS (candidate BSS) may easily exceed the performance gain value, and a roaming request may be performed. On the other hand, in a case where the adjusted throughput of the selected BSS (candidate BSS) is low (an AP has a low capability), when the performance gain value is configured to be a high constant value, the adjusted throughput of the selected BSS (candidate BSS) may fail to exceed the performance gain value, and thus a roaming request may not be performed. Therefore, a performance gain value is required to be configured in consideration of a throughput situation (an estimated throughput predicted value). The (adjusted) estimated throughput may be a downlink throughput or an uplink throughput of an AP operating the BSS.

Figure 20:
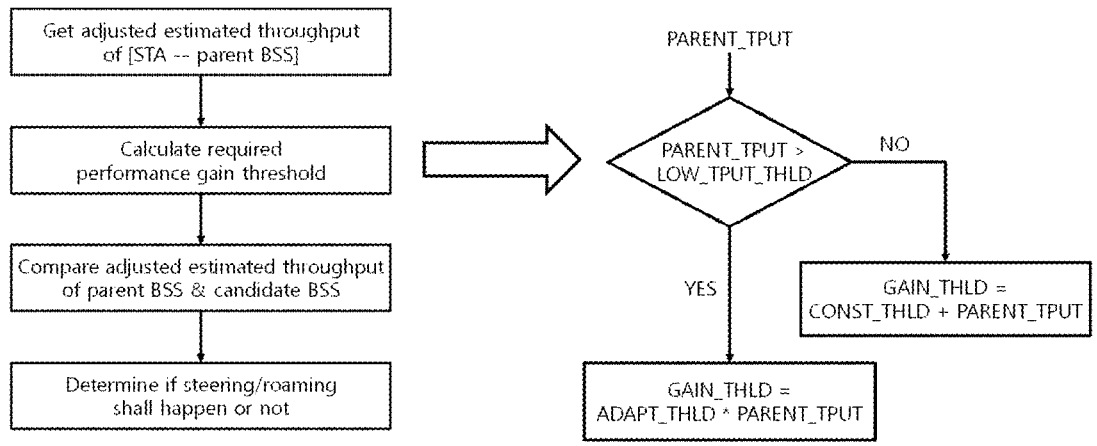
FIG. 20 illustrates a client roaming method according to an embodiment of the present disclosure.

FIG. 20 illustrates a client roaming method according to an embodiment of the present disclosure.

Referring to FIG. 20, the throughput of a BSS which a client may access in a MAP network is estimated, and the adjusted estimated throughput (reflecting the number of hops) of a BSS which is currently associated with the client is stored. A performance gain for client roaming may vary based on a predicted value (i.e., high and low throughput) of the adjusted estimated throughput of the currently associated BSS (parent BSS). The performance gain value is required to be adaptive, and a percentage may be applied thereto. The percentage value may be specifically designated by a user. For example, if the percentage value is designated to be 50%, and the throughput of the currently associated BSS (parent BSS) relative to the client is 100 Mbps, the performance gain value may be 50 Mbps, which is 50% of 100 Mbps. Therefore, client roaming may be considered only when the adjusted estimated throughput of a selected BSS (candidate BSS) among client-usable BSSs is equal to or greater than 150 Mbps (i.e., 100 Mbps+50 Mbps). In other words, when there is no available BSS having an estimated throughput of 150 Mbps or greater in a MAP network (there is no AP operating a BSS having 150 Mbps or greater), client roaming is not requested. That is, a threshold value (a performance gain threshold value) for client roaming may be 150 Mbps.

When the performance gain value is calculated by the percentage value, the performance gain threshold value is calculated to be also low. Therefore, a low performance gain threshold value may cause frequent client roaming.

Therefore, if a MAP network includes APs having low capabilities, the performance gain value may be considered to be a constant value.

In addition, if a client is located far away from all APs included in a MAP network, an adjusted estimated throughput may be predicted to be a low value. If there is a roaming request from a controller (C), this case may require more time for disconnection and reconnection than when the client is located close to an AP of a target BSS. Moreover, when a performance gain threshold value is calculated using a percentage value, a client roaming request may be performed even when there is no large performance gain via roaming. For example, when the adjusted estimated throughput of the currently associated BSS (parent BSS) is 20 Mbps, and a performance gain percentage value is configured to be 50%, a performance gain value is 10 Mbps which is 50% of 20 Mbps. Therefore, a performance gain threshold value is 30 Mbps (20 Mbps+20 Mbps*50%), and thus when the estimated throughput of the selected BSS (candidate BSS) is equal to or greater than 30 Mbps, a roaming request may be performed. Client roaming being performed to obtain a performance gain of 10 Mbps may be inefficient compared to a rather long time being required for a disconnection and a reconnection for client roaming. Therefore, configuring a particular constant value as a performance threshold value may be more efficient than configuring a performance gain threshold value using percentages, so as to improve a performance gain via client roaming. For example, if a performance gain value is configured to be a particular constant value (e.g., 25 Mbps), a client roaming request may be performed only when the adjusted estimated throughput of a selected BSS (candidate BSS) is equal to or greater than 45 Mbps (20 Mbps+25 Mbps).

Three parameters which are adjustable by a user may be required for client roaming.

Specifically, the first parameter may be a value for determining whether an adjusted estimated throughput predicted from an AP of a currently associated BSS (parameter BSS) connected to a client is equal to or lower than a pre-configured particular standard. For example, if the adjusted estimated throughput of the currently associated BSS (parameter BSS) is predicted to be equal to or lower than a pre-configured particular standard, a performance gain value is required to be determined based on a particular constant. This is because, when the adjusted estimated throughput of the currently associated BSS (parameter BSS) is predicted to be low, it is more efficient to determine a performance gain threshold value by using a particular constant than by using a percentage. In other words, the first parameter indicates a parameter for determining whether a performance gain value is determined based on a percentage or is determined to be a particular constant value.

The second parameter may be a performance gain value which is configured to be a user-adjustable particular constant value. In a case where the adjusted estimated throughput of the currently associated BSS (parameter BSS) is not equal to or smaller than the first parameter, a performance gain threshold value is required to be adaptive, and percentages may be used for a performance gain value.

That is, the third parameter may be a percentage value for configuration of a performance gain value. If the adjusted estimated throughput of the selected BSS (candidate BSS) is higher than a configured performance gain threshold value, a client roaming request may be transmitted. In addition, the selected BSS (candidate BSS) is required to be defined in a BTM request frame.

Therefore, a client roaming request is performed only when the adjusted throughput of the selected BSS (candidate BSS) is larger than a particular value pre-configured using the above three parameters, that is, only when the adjusted throughput satisfies a required performance gain. Accordingly, even when a client is located at the middle point between two APs, frequent roaming requests may be prevented, and thus stopping of data traffic due to client roaming may be reduced.

A performance gain threshold value may be expressed as Equation 1 below.

$$\text{Performance gain threshold} = \text{Estimated throughput for AP downlink of BSS associated with current client} + \text{Performance gain} \quad \text{[Equation 1]}$$

In a normalized client roaming process, a controller (C) collects parameters for throughput estimation described above, and compares an estimated throughput predicted (adjusted) based on the collected parameters with the first parameter. The (adjusted) estimated throughput is the throughput of a BSS which a client currently accesses. According to a result of the comparison, a performance gain value is determined/configured based on a particular constant value (the second parameter) or a percentage value (the third parameter), and a performance gain threshold value is determined according to the determined/configured performance gain value. Thereafter, the controller (C) predicts the (adjusted) throughput value of each of multiple BSSs included in a MAP network, based on the pre-collected parameters for throughput estimation. The (adjusted) throughput values of the multiple BSSs are compared with the determined performance gain threshold value, and when an (adjusted) throughput value is greater than the performance gain threshold value, client roaming may be requested.

A throughput described with reference to FIG. 11 to FIG. 20 may indicate a value indicating a connection state with an AP operating a BSS when a client is included in the BSS.

Figure 21:
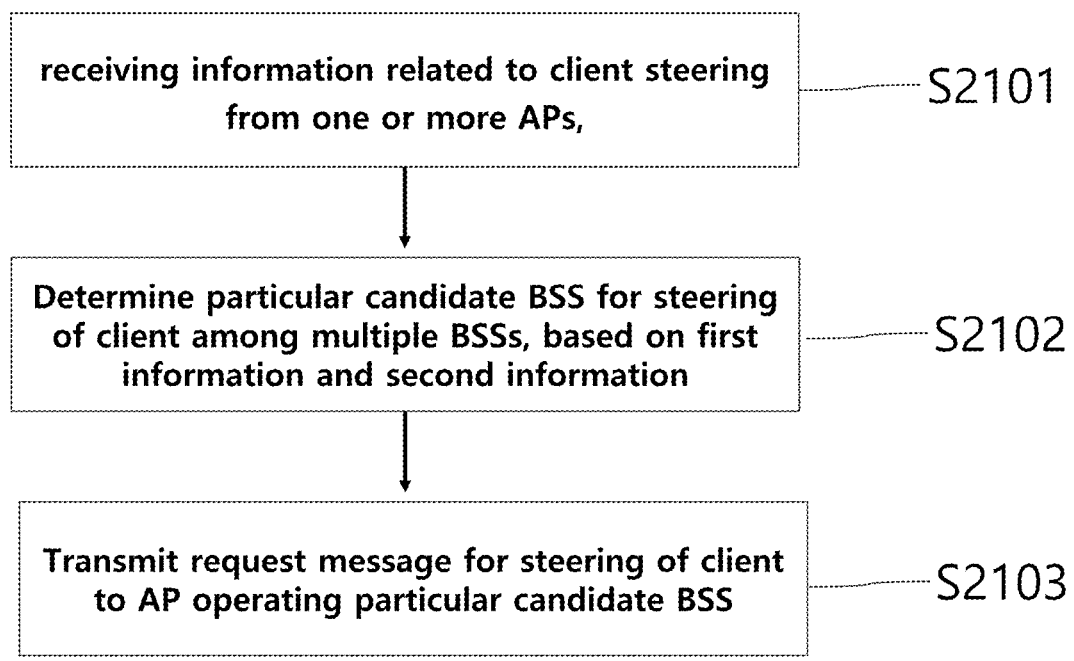
FIG. 21 is a flowchart illustrating an operation process of a controller performing a client steering method according to an embodiment of the present disclosure.

FIG. 21 is a flowchart illustrating an operation process of a controller performing a client steering method according to an embodiment of the present disclosure.

That is, FIG. 21 illustrates an operation process of a controller performing the above methods with reference to FIG. 11 to FIG. 20.

Referring to FIG. 21, a controller first receives information for steering of a client from one or more APs (S2101).

The one or more APs may operate multiple basic service sets (BSSs), and the information may include first information including parameters related to a connection state of a channel which is being used by each of the multiple BSSs, and second information including parameters related to capabilities of the multiple BSSs and parameters related to a capability of the client.

The controller determines a particular candidate BSS for steering of the client among the multiple BSSs, based on the first information and the second information (S2102).

The controller transmits, to an AP operating the particular candidate BSS, a request message for steering of the client (S2103).

The controller may be a logical entity included in the multiple AP network.

The controller may further perform an operation of calculating throughputs of the multiple BSSs, based on the first information and the second information before operation S2102.

The particular candidate BSS may be determined based on the throughputs.

The throughputs may be calculated using a neural network system.

The particular candidate BSS may be a BSS having a highest throughput among the throughputs.

The first information may include a parameter indicating a channel usage rate, a parameter indicating a signal strength, and a parameter indicating a transmission speed, and the second information may include a parameter indicating a spatial stream, a parameter indicating a modulation and coding scheme (MCS)-specific data rate, a parameter indicating a channel bandwidth, a parameter indicating a band frequency, and a parameter indicating a connection state with a WAN.

The throughputs may be calculated by calculating first throughput information, based on the parameter indicating a spatial stream, the parameter indicating an MCS-specific data rate, the parameter indicating a channel bandwidth, and the parameter indicating a band frequency, which are included in the first information and the second information, and additionally considering the parameter indicating a connection state with the WAN with respect to the first throughput information.

The parameter indicating a connection state with the WAN may be determined according to whether a connection from the AP to the WAN is a wired connection or a wireless connection.

When the connection from the AP to the WAN is a wireless connection, the parameter indicating a connection state with the WAN may be determined based on whether the wireless connection is a backhaul-dedicated connection or a connection sharing a backhaul and a fronthaul.

The first throughput information and the throughputs may be calculated using different neural network systems, respectively.

The request message may be transmitted when the highest throughput is equal to or greater than a pre-configured first threshold value.

The client may be included in a first BSS among the multiple BSSs, and the request message may be transmitted when a difference between the highest throughput and a throughput of the first BSS exceeds a pre-configured second threshold value.

The second threshold value may be a particular constant, and may be determined based on a percentage value using the throughput of the first BSS.

Each of the throughputs may be a value indicating, when the client is included in one BSS among the multiple BSSs, a connection state between the client and an AP operating the one BSS.

The present disclosure has been described based on an example of wireless LAN communication as described above, but the present disclosure is not limited thereto, and may be applied to other communication systems, such as cellular communication, in the same way. Additionally, while the method, device, and system of the present disclosure are described in relation to specific embodiments thereof, some or all of the components or operations of the present disclosure may be implemented using a computer system having a general purpose hardware architecture.

The features, structures, and effects described in the above embodiments are included in at least one embodiment of the present disclosure and are not necessary limited to one embodiment. Furthermore, features, structures, and effects shown in each embodiment may be combined or modified in other embodiments by those skilled in the art. Therefore, it should be interpreted that contents relating to such combination and modification are included in the range of the present disclosure.

While the present disclosure is described mainly based on the above embodiments but is not limited thereto, it will be understood by those skilled in the art that various changes and modifications are made without departing from the spirit and scope of the present disclosure. For example, each component specifically shown in the embodiments may be modified and implemented. It should be interpreted that differences relating to such modifications and application are included in the scope of the present disclosure defined in the appended claims.

The invention claimed is:

1. A method for steering of a client in a multiple access point (AP) network, which is performed by a controller, the method comprising:

receiving information for steering of the client from one or more APs, wherein the one or more APs operating multiple basic service sets (BSSs), wherein the information comprises first information including parameters related to a connection state of a channel which is being used by each of the multiple BSSs, and second information including parameters related to capabilities of the multiple BSSs and parameters related to a capability of the client;

determining a particular candidate BSS for steering of the client among the multiple BSSs, based on the first information and the second information; and transmitting, to an AP operating the particular candidate BSS, a request message for steering of the client, wherein the controller is a logical entity included in the multiple AP network.

2. The method of claim 1, the method further comprising:
calculating throughputs of the multiple BSSs, based on the first information and the second information, wherein the particular candidate BSS is determined based on the throughputs.

3. The method of claim 2,
wherein the throughputs are calculated using a neural network system.

4. The method of claim 2,
wherein the particular candidate BSS is a BSS having a highest throughput among the throughputs.

5. The method of claim 2,
wherein the first information comprises a parameter indicating a channel usage rate, a parameter indicating a signal strength, and a parameter indicating a transmission speed, and wherein the second information comprises a parameter indicating a spatial stream, a parameter indicating a modulation and coding scheme (MCS)-specific data rate, a parameter indicating a channel bandwidth, a parameter indicating a band frequency, and a parameter indicating a connection state with a WAN.

6. The method of claim 5, wherein the calculating of the throughputs comprises:
calculating first throughput information, based on the parameter indicating a spatial stream, the parameter indicating an MCS-specific data rate, the parameter indicating a channel bandwidth, and the parameter indicating a band frequency, which are included in the first information and the second information; and calculating the throughputs by additionally considering the parameter indicating a connection state with the WAN with respect to the first throughput information.

7. The method of claim 6,
wherein the parameter indicating a connection state with the WAN is determined according to whether a connection from the AP to the WAN is a wired connection or a wireless connection.

8. The method of claim 7,
wherein, when the connection from the AP to the WAN is a wireless connection, the parameter indicating a connection state with the WAN is determined based on whether the wireless connection is a backhaul-dedicated connection or a connection sharing a backhaul and a fronthaul.

9. The method of claim 6,
wherein the first throughput information and the throughputs are calculated using different neural network systems, respectively.

10. The method of claim 4,
wherein the request message is transmitted when the highest throughput is equal to or greater than a pre-configured first threshold value.

11. The method of claim 4,
wherein the client is included in a first BSS among the multiple BSSs, and wherein the request message is transmitted when a difference between the highest throughput and a throughput of the first BSS exceeds a pre-configured second threshold value.

12. The method of claim 11,
wherein the second threshold value is a particular constant.

13. The method of claim 11,
wherein the second threshold value is determined based on a percentage value using the throughput of the first BSS.

14. The method of claim 2,
when the client is included in one BSS among the multiple BSSs, wherein each of the throughputs is a value indicating a connection state between the client and an AP operating the one BSS.

15. A device for performing a method for steering of a client in a multiple access point (AP) network, the device comprising:
a transceiver;
a controller; and
a memory configured to store instructions for operations executed by the controller and connected to the controller, wherein the operations comprise:
receiving information for steering of the client from one or more APs, wherein the one or more APs operating multiple basic service sets (BSSs), wherein the information comprises first information including parameters related to a connection state of a channel which is being used by each of the multiple BSSs, and second information including parameters related to capabilities of the multiple BSSs and parameters related to a capability of the client;

determining a particular candidate BSS for steering of the client among the multiple BSSs, based on the first information and the second information; and transmitting, to an AP operating the particular candidate BSS, a request message for steering of the client, wherein the controller is a logical entity included in the multiple AP network.

16. The device of claim 15,
wherein the operations further comprise:
calculating throughputs of the multiple BSSs, based on the first information and the second information, and the particular candidate BSS is determined based on the throughputs.

17. The device of claim 16,
wherein the particular candidate BSS is a BSS having a highest throughput among the throughputs.

18. The device of claim 16,
wherein the first information comprises a parameter indicating a channel usage rate, a parameter indicating a signal strength, and a parameter indicating a transmission speed, and wherein the second information comprises a parameter indicating a spatial stream, a parameter indicating a modulation and coding scheme (MCS)-specific data rate, a parameter indicating a channel bandwidth, a parameter indicating a band frequency, and a parameter indicating a connection state with a WAN.

19. The device of claim 18, wherein the calculating of the throughputs comprises:
calculating first throughput information, based on the parameter indicating a spatial stream, the parameter indicating an MCS-specific data rate, the parameter indicating a channel bandwidth, and the parameter indicating a band frequency, which are included in the first information and the second information; and
calculating the throughputs by additionally considering the parameter indicating a connection state with the WAN with respect to the first throughput information.

20. The device of claim 16,
wherein each of the throughputs is a value indicating, when the client is included in one BSS among the multiple BSSs, a connection state between the client and an AP operating the one BSS.

* * * * *